US00RE49903E

(19) United States
(12) Reissued Patent
Yi et al.

(10) Patent Number: US RE49,903 E
(45) Date of Reissued Patent: Apr. 2, 2024

(54) RADIO FREQUENCY RECEIVER AND RECEIVING METHOD

(71) Applicant: Huawei Technologies Co., Ltd., Shenzhen (CN)

(72) Inventors: Min Yi, Shanghai (CN); Jian Liang, Shanghai (CN); Nianyong Zhu, Shanghai (CN)

(73) Assignee: Huawei Technologies Co., Ltd., Shenzhen (CN)

(21) Appl. No.: 16/502,959

(22) Filed: Jul. 3, 2019

Related U.S. Patent Documents

Reissue of:
(64) Patent No.: 9,698,925
Issued: Jul. 4, 2017
Appl. No.: 14/821,464
Filed: Aug. 7, 2015

(30) Foreign Application Priority Data

Aug. 7, 2014 (CN) ..... 201410387196.4

(51) Int. Cl.
*H04B 1/12* (2006.01)
*H04B 1/00* (2006.01)

(52) U.S. Cl.
CPC ..... *H04B 1/126* (2013.01); *H04B 1/0057* (2013.01)

(58) Field of Classification Search
None
See application file for complete search history.

(56) References Cited

U.S. PATENT DOCUMENTS 5,485,164 A * 1/1996 Compton ..... H01Q 1/247 331/55
5,493,710 A * 2/1996 Takahara ..... H03J 7/065 455/182.2

(Continued)

FOREIGN PATENT DOCUMENTS

CN 101316105 A 12/2008
CN 101320990 A 12/2008

(Continued)

OTHER PUBLICATIONS

AF Samueli, et al., "VLSI Architectures for a Hiah-Sweed tunable Digital Modulator/Demodulator/Bandpass-Filter Chip Set", Integrated Circuits and Systems Laboratory Electrical engineering Department, University of California, Los Angeles, 1992 IEEE, pp. 1065-1068.

(Continued)

*Primary Examiner* — Fred O Ferris, III
(74) *Attorney, Agent, or Firm* — Leydig, Voit & Mayer, Ltd.

(57) ABSTRACT

The present invention discloses a radio frequency receiver and a receiving method, where the method includes: performing band splitting on a radio frequency signal of multiple carriers to obtain at least one band signal, and outputting the signal; separately performing filtering and amplification processing on the at least one band signal to obtain at least one processed signal; generating multiple oscillation signals; and selectively receiving a processed signal, of the at least one processed signal, that includes a target carrier; receiving an oscillation signal corresponding to the target carrier; selectively selecting a frequency division ratio from multiple frequency division ratios; using the frequency division ratio to perform frequency division on the received oscillation signal to obtain a local oscillator signal; using the local oscillator signal to perform frequency mixing on the received processed signal that includes the target carrier to obtain a mixed signal.

17 Claims, 13 Drawing Sheets

(56) References Cited

U.S. PATENT DOCUMENTS

| | | | | |
|---|---|---|---|---|
| 5,966,666 | A | 10/1999 | Amaguchi et al. | |
| 6,029,052 | A | 2/2000 | Isberg et al. | |
| 6,870,429 | B2 * | 3/2005 | Hawley | H04L 27/362 331/16 |
| 7,392,026 | B2 * | 6/2008 | Alam | H04B 1/0057 455/180.1 |
| 8,503,546 | B1 * | 8/2013 | Ashrafi | H04L 27/362 370/208 |
| 8,670,668 | B2 * | 3/2014 | Marlcevic | H04H 20/69 398/115 |
| 9,077,410 | B2 * | 7/2015 | Song | H04L 27/264 |
| 9,124,311 | B2 * | 9/2015 | Wu | H04B 1/0057 |
| 9,401,732 | B2 * | 7/2016 | He | H04B 1/005 |
| 9,432,063 | B2 * | 8/2016 | Ou | |
| 2002/0080884 | A1 * | 6/2002 | Lee | H04L 1/0002 375/261 |
| 2006/0045126 | A1 | 3/2006 | Klahn et al. | |
| 2008/0299902 | A1 | 12/2008 | Shin et al. | |
| 2009/0275357 | A1 | 11/2009 | Nakamura et al. | |
| 2012/0069876 | A1 | 3/2012 | Kamizuma et al. | |
| 2012/0327825 | A1 | 12/2012 | Gudem et al. | |
| 2013/0051284 | A1 | 2/2013 | Khlat | |
| 2014/0080433 | A1 | 3/2014 | He et al. | |
| 2014/0177489 | A1 * | 6/2014 | Liu | H04B 7/2643 370/280 |
| 2015/0042407 | A1 * | 2/2015 | Huang | H03L 7/185 331/18 |
| 2016/0127014 | A1 * | 5/2016 | Wloczysiak | H04B 1/16 375/318 |
| 2017/0033831 | A1 | 2/2017 | Liu et al. | |

FOREIGN PATENT DOCUMENTS

| | | | | |
|---|---|---|---|---|
| CN | 101908883 | A | 12/2010 | |
| CN | 101908896 | A | 12/2010 | |
| CN | 102420624 | A | 4/2012 | |
| CN | 102891695 | A | 1/2013 | |
| CN | 103338050 | A | 10/2013 | |
| CN | 104135301 | A | 11/2014 | |
| JP | H09261106 | A | 10/1997 | |
| JP | 2009147790 | A | 7/2009 | |
| JP | 2011250093 | A | 12/2011 | |
| JP | 2014521248 | A | 8/2014 | |
| WO | 9900910 | A1 | 1/1999 | |
| WO | 2012158976 | A1 | 11/2012 | |
| WO | WO 2013003503 | A2 | 1/2013 | |
| WO | WO 2013072865 | A1 | 5/2013 | |
| WO | WO 2012/158976 | * | 11/2021 | H04L 5/00 |

OTHER PUBLICATIONS

U.S. Appl. No. 14/821,464, filed Aug. 7, 2015.

U.S. Appl. No. 14/821,264, filed Aug. 7, 2015.

D'Luna et al., "A Single-Chip Universal Cable Set-Top Box/Modem Transceiver," IEEE Journal of Solid-State Circuits, vol. 34, No. 11, pp. 1647-1660 (Nov. 1999).

AG D'Luna et al.; A Single-Chip Universal Code Set-Toy Box/Modem Transceiver; IEEE Journal of Solid-State Circuits, vol. 34,_No. 11, Nov. 1999, pp. 1647-1660.*

* cited by examiner

RADIO FREQUENCY RECEIVER AND RECEIVING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims priority to Chinese Patent Application No. 201410387196.4, filed on Aug. 7, 2014, which is hereby incorporated by reference in its entirety.

TECHNICAL FIELD

The present invention relates to the field of communications, and in particular, to a radio frequency receiver and a receiving method.

BACKGROUND

Currently, in order to increase a communication bandwidth and achieve a higher user data throughput, a carrier aggregation (CA) technology is used in a Long-Term Evolution-Advanced (LTE-A) technology. A principle of the CA technology is that user communication data is carried on multiple carriers for communication. However, the introduction of the CA technology causes a great impact to an existing radio frequency receiver solution.

In the 3GPP (the 3$^{rd}$-Generation Partnership Project) protocol R10 (Release 10), as shown in FIG. 1, the following three CA application scenarios are defined:

intra-band, continuous CA;

intra-band, non-continuous CA; and inter-band, non-continuous CA, or also called inter-band CA, where A and B represent two aggregated carriers.

For the intra-band continuous CA application scenario, a radio frequency receiver solution may still be implemented by using a single frequency synthesizer as in a conventional way; for the two complicated application scenarios: intra-band non-continuous CA and inter-band non-continuous CA, using multiple frequency synthesizers is an only option for the radio frequency receiver solution. However, mutual interference exists between the multiple frequency synthesizers, including mutual pulling (VCO Pulling) between voltage controlled oscillators (VCO) and spurious coupling and crosstalk of the VCOs, which is a major problem that hinders single-chip integration of multiple frequency synthesizers. It should be noted that: 1. mutual pulling between VCOs is a common mutual-interference phenomenon when multiple VCOs work simultaneously. Using a scenario in which two VCOs work simultaneously as an example, oscillation energy of VCO 1 is coupled to VCO 2, so that an output signal of VCO 2 includes a frequency component of oscillation frequency of VCO 1, thereby affecting receiving quality when VCO 2 is used as a receiving channel of a local oscillator signal. 2. spurious coupling and crosstalk of VCOs refers to various spurious components (unwanted frequency components), except desired frequency components, inevitably included in frequency components actually output by the VCOs. The spurious components may be generated for many reasons, and may be caused by a reference clock or may be caused by nonlinearity of a frequency synthesizer. In an application scenario with multiple frequency synthesizers and multiple receiving channels, if a spurious component output by one of the VCOs is coupled to another receiving channel and is superimposed over a spectrum of a useful signal that needs to be received by the receiving channel, namely, falls within a receiving band of the receiving channel, receiving performance of the channel will be affected.

A possible radio frequency receiver solution is to dispose multiple frequency synthesizers on different chips, which can relatively effectively solve a mutual-interference problem of multiple frequency synthesizers. However, when the multi-chip solution is applied, a price to be paid is that areas and costs increase sharply, which conflicts with increasingly intense requirements, at present, of a mobile terminal on a small size and cost efficiency of a radio frequency subsystem.

SUMMARY

Embodiments of the present invention provide a radio frequency receiver to solve a problem that multiple frequency synthesizers cannot be integrated into a single chip in the prior art.

According to a first aspect, an embodiment of the present invention provides a radio frequency receiver, including:

a band splitter, where an input end of the band splitter is coupled to an antenna, and the band splitter is configured to: receive a radio frequency signal from the antenna; perform band splitting on the radio frequency signal to obtain at least one band signal; and output the signal, where the radio frequency signal is a carrier aggregated signal of multiple carriers, and each band signal includes at least one carrier of he multiple carriers;

a processing circuit, where the processing circuit is coupled to an output end of the band splitter, and is configured to separately perform filtering and amplification processing on the at least one band signal to obtain at least one processed signal;

multiple frequency synthesizers, configured to generate multiple oscillation signals; and multiple receiving channels, where the multiple receiving channels correspond to the multiple frequency synthesizers in a one-to-one manner, and any of the receiving channels is configured to: selectively receive a processed signal, of the at least one processed signal output by the processing circuit, that includes a target carrier of the any receiving channel; receive an oscillation signal generated by a frequency synthesizer corresponding to the any receiving channel; selectively select a frequency division ratio of the any receiving channel from multiple frequency division ratios; use the frequency division ratio to perform frequency division on the received oscillation signal to obtain a local oscillator signal of the any receiving channel; use the local oscillator signal to perform frequency mixing on the received processed signal that includes the target carrier to obtain a mixed signal; and generate, based on the mixed signal, a baseband signal corresponding to the target carrier, where the target carrier is one of the multiple carriers included in the radio frequency signal, and the multiple receiving channels suppress mutual interference between the multiple frequency synthesizers by separately selecting their respective frequency division ratios.

In a first possible implementation manner of the first aspect, the multiple frequency division ratios are selected from a set that includes multiple integral frequency division ratios and multiple fractional frequency division ratios.

With reference to the first aspect or the first possible implementation manner of the first aspect, in a second possible implementation manner, any of the processing units includes:

a bandpass filter, configured to receive one band signal in the at least one band signal output by the band splitter, and filter out a signal outside a band of the band signal to obtain a signal within one band; and a radio frequency amplifier, coupled to the bandpass filter and configured to receive the signal within the band and perform gain amplification on the signal within the band to obtain the processed signal.

With reference to the second possible implementation manner of the first aspect, in a third possible implementation manner, the radio frequency receiver further includes: a switching unit, where the switching unit is coupled between the multiple processing units and the multiple receiving channels, and the switching unit is configured to exercise switching control, so that the any receiving channel is selectively coupled to a processing unit in the processing circuit to receive the processed signal that includes the target carrier of the any receiving channel.

With reference to the first aspect or any possible implementation manner of the first aspect, in a fourth possible implementation manner, the any receiving channel of the multiple receiving channels includes:

a configurable frequency divider, configured to: receive a control signal; selectively select, under control of the control signal, the frequency division ratio of the any receiving channel from the multiple frequency division ratios; and perform, based on the frequency division ratio, frequency division on the oscillation signal received by the any receiving channel to obtain the local oscillator signal;

a frequency mixer, configured to use the local oscillator signal to perform frequency mixing on the received processed signal to obtain the mixed signal;

a lowpass filter, configured to perform noise suppression on the mixed signal; and a baseband amplifier, configured to amplify a mixed signal obtained after noise suppression is performed by the lowpass filter, so as to generate the baseband signal corresponding to the target carrier.

With reference to the fourth possible implementation manner of the first aspect, in a fifth possible implementation manner, the configurable frequency divider includes a one-out-of-many frequency divider, and the one-out-of-many frequency divider includes multiple frequency division modes, where each frequency division mode corresponds to an integral frequency division ratio or a fractional frequency division ratio; and the one-out-of-many frequency divider is configured to configure, under control of the control signal, one frequency division mode of the multiple frequency division modes as a current working mode, so as to implement selective selection of the frequency division ratio of the any receiving channel from the multiple frequency division ratios.

With reference to the fourth possible implementation manner of the first aspect, in a sixth possible implementation manner, the configurable frequency divider includes multiple frequency dividing units and a selector, where: each frequency dividing unit corresponds to an integral frequency division ratio or a fractional frequency division ratio; one ends of the multiple frequency dividing units are separately coupled to an input end of the configurable frequency divider, and the other ends of the multiple frequency dividing units are separately coupled to an input end of the selector; an output end of the selector is coupled to an output end of the configurable frequency divider, and the selector is configured to receive the control signal, select, under control of the control signal, one frequency dividing unit of the multiple frequency dividing units, and turn on the frequency dividing unit, so as to implement selective selection of the frequency division ratio of the any receiving channel from the multiple frequency division ratios.

With reference to the fourth possible implementation manner or the fifth possible implementation manner or the sixth possible implementation manner of the first aspect, in a seventh possible implementation manner, the radio frequency receiver further includes a control signal generator, configured to generate a control signal required by the configurable frequency divider in the any receiving channel.

With reference to the first aspect or any implementation manner of the first to seventh possible implementation manners of the first aspect, in an eighth possible implementation manner, the radio frequency receiver further includes a baseband processor, configured to perform baseband processing on baseband signals output by the multiple receiving channels.

With reference to the first aspect or any implementation manner of the first to eighth possible implementation manners of the first aspect, in a ninth possible implementation manner, the any receiving channel is a zero-intermediate-frequency receiving channel.

With reference to the first aspect or any implementation manner of the first to ninth possible implementation manners of the first aspect, in a tenth possible implementation manner, the multiple frequency synthesizers and the multiple receiving channels are integrated in an integrated circuit.

According to a second aspect, an embodiment of the present invention provides a receiving method, including:

performing band splitting on a radio frequency signal to obtain at least one band signal, and output the signal, where the radio frequency signal is a carrier aggregated signal of multiple carriers, and each band signal includes at least one carrier of the multiple carriers;

separately performing filtering and amplification processing on the at least one band signal to obtain at least one processed signal;

generating multiple oscillation signals; and selectively receiving a processed signal, of the at least one processed signal, that includes a target carrier; receiving an oscillation signal, of the multiple oscillation signals, corresponding to the target carrier; selectively selecting a frequency division ratio from multiple frequency division ratios; using the frequency division ratio to perform frequency division on the received oscillation signal to obtain a local oscillator signal; using the local oscillator signal to perform frequency mixing on the received processed signal that includes the target carrier to obtain a mixed signal; and generating, based on the mixed signal, a baseband signal corresponding to the target carrier, where the target carrier is one of the multiple carriers included in the radio frequency signal, and mutual interference between the multiple oscillation signals is suppressed by separately selecting a frequency division ratio to perform frequency division on the multiple oscillation signals.

In a first possible implementation manner of the second aspect, the multiple frequency division ratios are selected from a set that includes multiple integral frequency division ratios and multiple fractional frequency division ratios.

With reference to the second aspect or the first possible implementation manner of the second aspect, in a second possible implementation manner, the separately performing filtering and amplification processing on the at least one band signal to obtain at least one processed signal includes:

receiving one band signal in the at least one band signal, filtering out a signal outside a band of the band signal to obtain a signal within one band, and performing gain amplification on the signal within the band to obtain the at least one processed signal.

With reference to the second possible implementation manner of the second aspect, in a third possible implementation manner, the selectively receiving a processed signal, of the at least one processed signal, that includes a target carrier includes:

exercising switching control, so as to implement selective reception, from the at least one processed signal, of the processed signal that includes the target carrier.

With reference to the third aspect or any possible implementation manner of the first to the third possible implementation manners, in a fourth possible implementation manner, the selectively selecting a frequency division ratio from multiple frequency division ratios; and using the frequency division ratio to perform frequency division on the received oscillation signal to obtain a local oscillator signal includes:

receiving a control signal; and selectively selecting, under control of the control signal, the frequency division ratio from the multiple frequency division ratios; and performing, based on the frequency division ratio, frequency division on the received oscillation signal to obtain the local oscillator signal.

In the present invention, by selectively selecting a frequency division ratio of each receiving channel, mutual interference between multiple frequency synthesizers corresponding to receiving channels can be effectively suppressed, so that a radio frequency receiver provided in the present invention can implement single-chip integration.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 2:
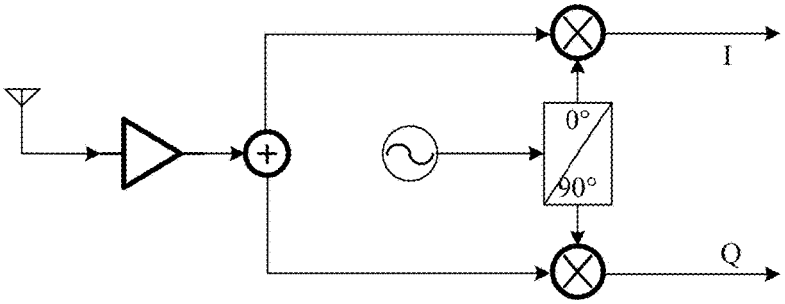
FIG. 2 is an architecture diagram of a zero-intermediate-frequency receiver in the prior art.

To facilitate better understanding of the technical solution of the present invention, an existing zero-intermediate-frequency receiver is first described briefly in the following. FIG. 2 shows an architecture diagram of an existing zero-intermediate-frequency (ZIF) receiver. After being amplified, a radio frequency signal received by a zero-intermediate-frequency receiver is mixed with two local oscillator signals that are in quadrature with each other to generate two baseband signals: an I (In-phase) signal and a Q (Quadrature) signal, separately. Because a frequency of the local oscillator signal is the same as a frequency of the radio frequency signal, a baseband signal is generated directly after the mixing, while channel selection and gain adjustment are performed on a baseband and are completed by a lowpass filter and a baseband amplifier on a chip. What is most attractive of the zero-intermediate-frequency receiver is that no intermediate frequency needs to be involved in a down conversion process, and an image frequency is the radio frequency signal itself and no image frequency interference exists. Compared with a superheterodyne receiver, the zero-intermediate-frequency receiver can omit an image suppression filter and an intermediate-frequency filter that are used in the superheterodyne receiver architecture. In this way, an external component is canceled on the one hand, which is conducive to single-chip integration of a system and reduces costs; and on the other hand, circuit modules and external nodes required by the system are reduced, which reduces power consumption required by the receiver and reduces vulnerability of a radio frequency signal to external interference.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 3:
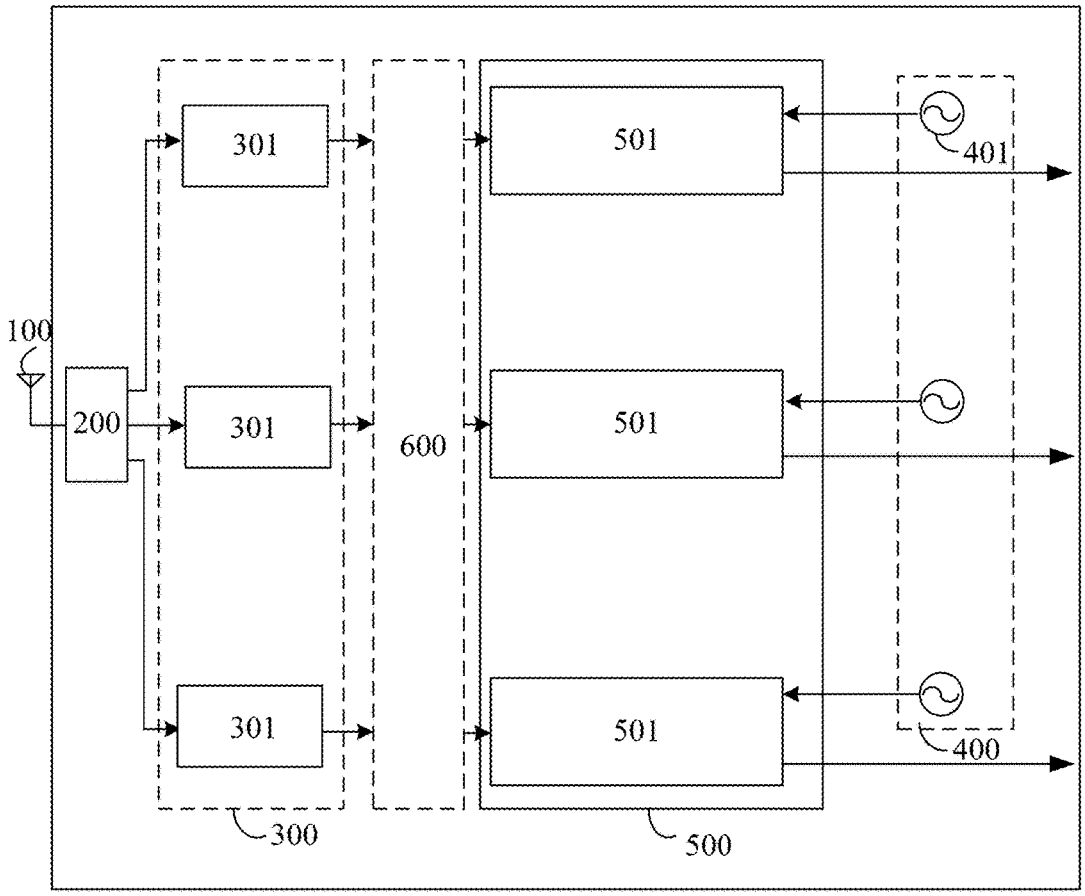
FIG. 3 is an architecture diagram of a radio frequency receiver according to Embodiment 1 of the present invention.

As shown in FIG. 3, Embodiment 1 of the present invention provides a radio frequency receiver, including: an antenna 100, a band splitter 200, a processing circuit 300, multiple frequency synthesizers 400, and multiple receiving channels 500.

Figure 1:
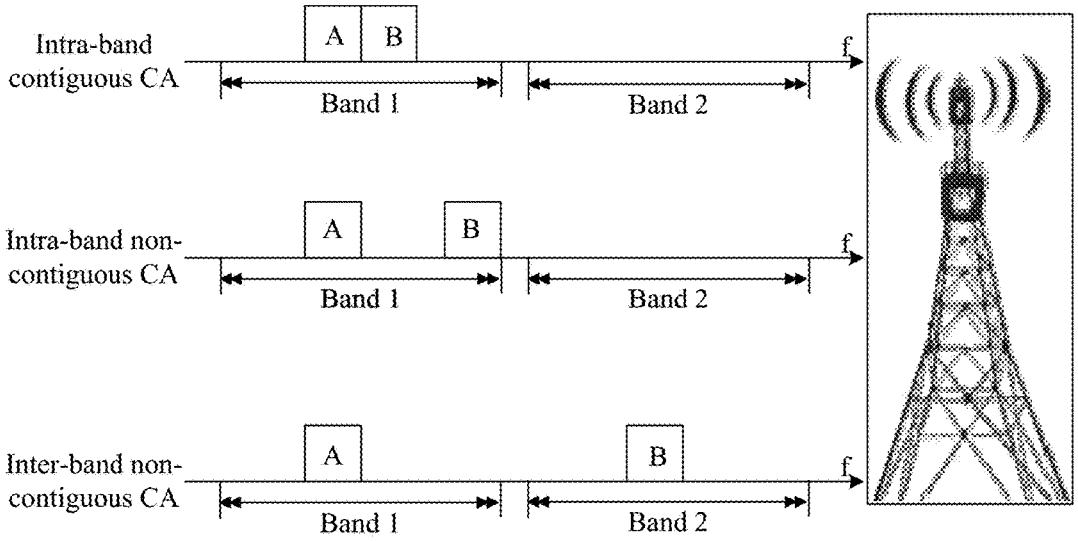
FIG. 1 is a schematic diagram of typical application scenarios of carrier aggregation.

The antenna 100 is configured to receive a radio frequency signal, for example, a radio frequency signal transmitted by a base station in a wireless network, where the radio frequency signal is a carrier aggregated signal of multiple carriers. A person skilled in the art should understand that in practical application, a manner of carrier aggregation of multiple carriers includes at least one of: intra-band continuous carrier aggregation, intra-band non-continuous carrier aggregation, and inter-band non-continuous carrier aggregation. For details, reference may be made to several typical multi-carrier aggregation manners shown in FIG. 1. A person skilled in the art should understand that when the radio frequency receiver in this embodiment of the present invention is integrated to a chip, the antenna 100 is generally not included in the chip.

An input end of the band splitter 200 is coupled to the antenna 100, and the band splitter 200 is configured to receive the radio frequency signal output by the antenna 100; perform band splitting on the radio frequency signal to obtain at least one band signal; and output the signal, where each band signal includes at least one carrier of the multiple carriers. It should be noted that the band splitter 200 in this embodiment may include a diplexer (Diplexer, or called a transmit-receive coupler), a triplexer, a quadruplexer, or the like. Specifically, which component is to be used depends on a quantity of bands included in the CA signal of multiple carriers. For example, when the CA signal of the multiple carriers includes three band signals, a triplexer needs to be used to split the three band signals; and when the CA signal of the multiple carriers includes two band signals, a Diplexer is enough for splitting the two band signals. In addition, a person skilled in the art should understand that coupling mentioned in this embodiment of the present invention is already interpreted generically in the art, and includes but is not limited to direct connection or indirect connection in an electric sense. The same applies hereinafter, and details are not described again.

In this embodiment, the band splitter 200 may perform band splitting on the radio frequency signal according to the manner of carrier aggregation of the multiple carriers. Specifically, if the radio frequency signal received by the antenna 100 is an inter-band CA signal of multiple carriers, the band splitter 200 may split the inter-band CA signal into multiple band signals according to whether a band is high or low. For example, referring to FIG. 8A, for a radio frequency signal aggregating carrier A (whose carrier frequency is 935 MHz) in Band 8 and carrier B (whose carrier frequency is 1870.1 MHz) in Band 3, the band splitter 200 may correspondingly use a Diplexer. The Diplexer may split the radio frequency signal into a signal of a high band (namely, Band 3 that includes carrier B) and a signal of a low band (namely, Band 8 that includes carrier A). If the radio frequency signal received by the antenna 100 is an intra-band non-continuous CA signal or an intra-band continuous CA signal, the band splitter 200 may group multiple carriers of intra-band non-continuous CA or intra-band continuous CA into one band signal. For example, referring to FIG. 9A, Band 25 includes two non-continuous carriers A and B. Because precision of the Diplexer is limited, carriers aggregated in Band 25 cannot be split. During output, the Diplexer selects either high-band output or low-band output, and outputs a band signal (namely, Band 25) that includes carrier A and carrier B. It should be noted that, for band ranges of the band signals such as Band 3, Band 8, and Band 25 mentioned herein, reference may be made to corresponding stipulations in the 3GPP protocol, and details are not described herein again.

The processing circuit 300 is coupled to an output end of the band splitter 200, and is configured to separately perform filtering and amplification processing for the at least one band signal output by the band splitter 200, so as to obtain at least one processed signal.

The multiple frequency synthesizers 400 are configured to generate multiple oscillation signals, where frequencies of the multiple oscillation signals are different from each other.

The multiple receiving channels 500 correspond to the multiple frequency synthesizers 400 in a one-to-one manner, and any of the receiving channels is configured to: selectively receive a processed signal, of the at least one processed signal output by the processing circuit 300, that includes a target carrier of the any receiving channel; receive an oscillation signal, of the multiple oscillation signals generated by the multiple frequency synthesizers 400, generated by a frequency synthesizer corresponding to the any receiving channel; selectively select a frequency division ratio of the any receiving channel from multiple frequency division ratios; use the frequency division ratio to perform frequency division on the received oscillation signal to obtain a local oscillator signal of the any receiving channel; use the local oscillator signal to perform frequency mixing on the received processed signal that includes the target carrier to obtain a mixed signal; and generate, based on the mixed signal, a baseband signal corresponding to the target carrier, where the target carrier is one of the multiple carriers included in the radio frequency signal, and the multiple receiving channels 500 suppress mutual interference between the multiple frequency synthesizers 400 by selecting their respective frequency division ratios separately.

It should be noted that the mutual interference between the multiple frequency synthesizers mainly includes: 1. mutual pulling; 2. spurious coupling and crosstalk. In this embodiment, the any receiving channel selects the frequency division ratio of the any receiving channel, and therefore, a mutual pulling effect between the oscillation signal generated by the frequency synthesizer corresponding to the any receiving channel and another oscillation signal, in the multiple oscillation signals, except the oscillation signal corresponding to the any receiving channel is weakened, that is, a pulling effect, on the any receiving channel, caused by another frequency synthesizer except the frequency synthesizer corresponding to the any receiving channel is suppressed, and no superimposition occurs between the target carrier of the any receiving channel and a signal obtained after the any receiving channel performs frequency division on a spurious component of the another oscillation signal, that is, coupling and crosstalk caused when the spurious component of the oscillation signal generated by the another frequency synthesizer except the frequency synthesizer corresponding to the any receiving channel is coupled to the any receiving channel are suppressed.

Figure 8A:
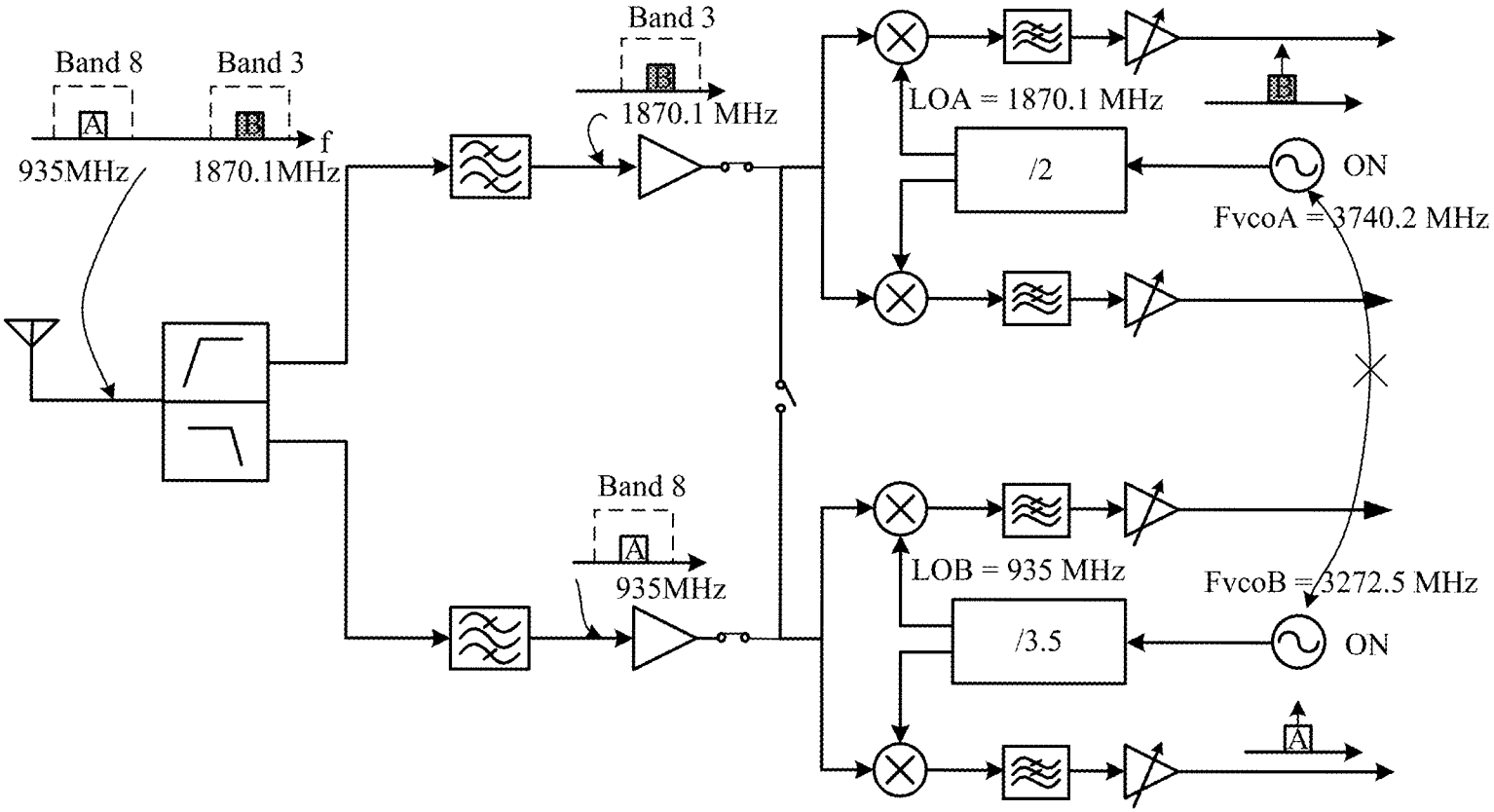
FIG. 8A is a schematic diagram of the radio frequency receiver shown in FIG. 5 receiving an inter-band non-continuous CA signal.
Figure 8B:
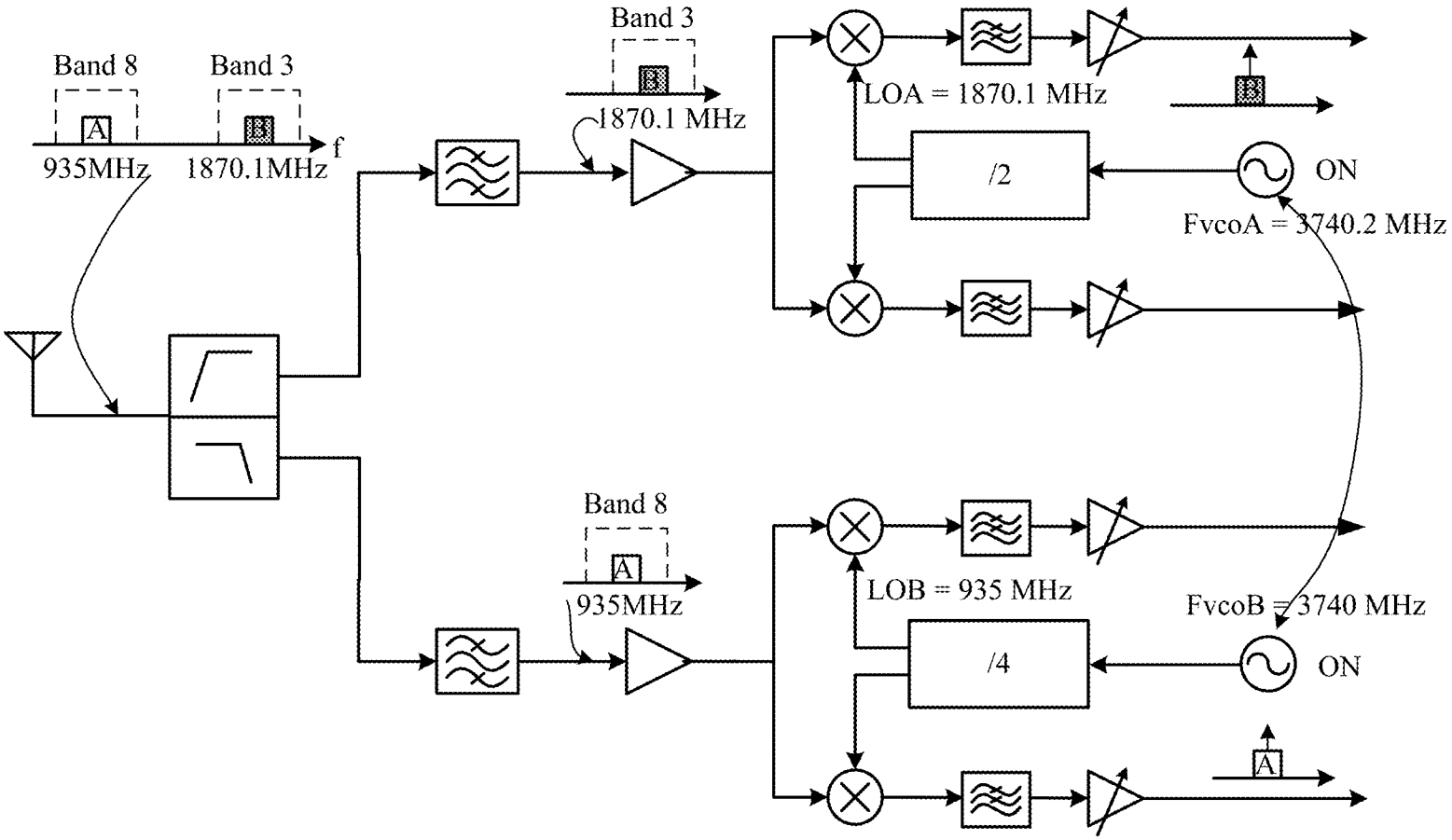
FIG. 8B is a schematic diagram showing that mutual pulling exists between two VCOs in a conventional radio frequency receiver.
Figure 9A:
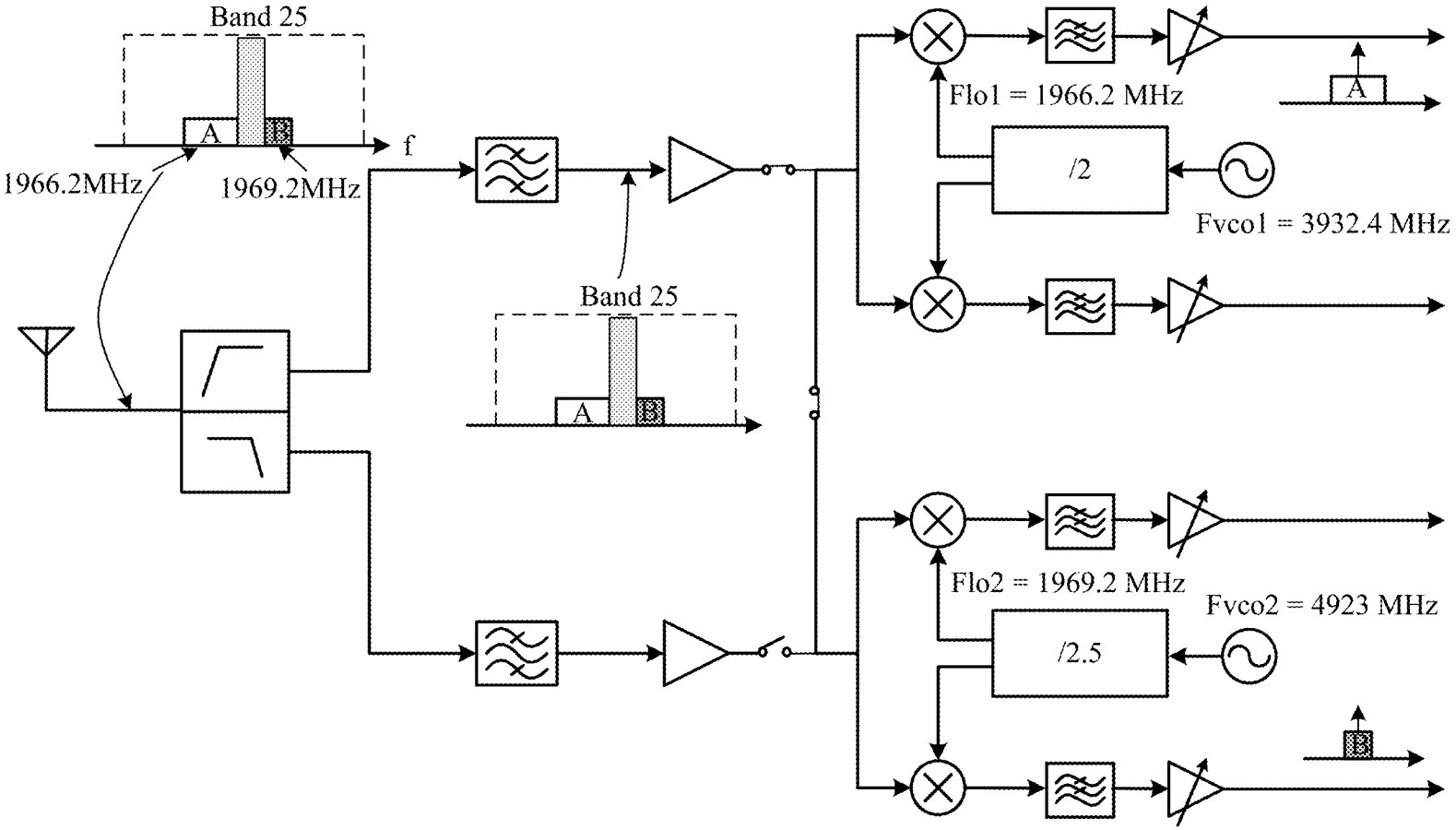
FIG. 9A is a schematic diagram of the radio frequency receiver shown in FIG. 5 receiving an intra-band non-continuous CA signal.
Figure 9B:
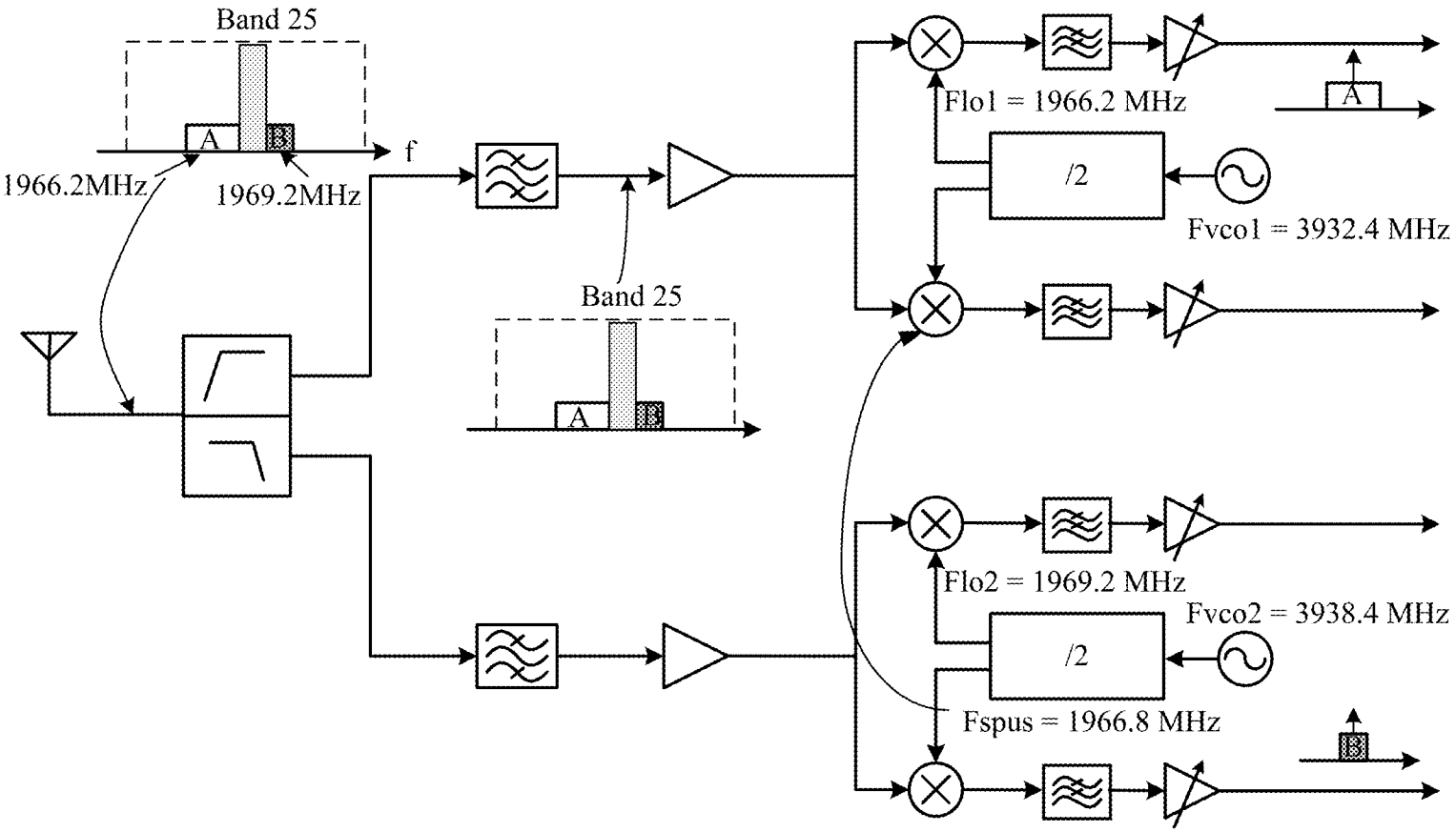
FIG. 9B is a schematic diagram showing that spurious coupling and crosstalk exist between two VCOs in a conventional radio frequency receiver.

Therefore, it can be seen that mutual interference between multiple frequency dividers is effectively suppressed by using the technical solution in this embodiment. To better describe the technical effect of the present invention, the following uses examples to give a description with reference to FIG. 8A and FIG. 9A. As shown in FIG. 8A, carrier A in Band 8 and carrier B in Band 3 are aggregated in an inter-band manner, a carrier frequency of carrier A is $F_A$=1870.1 MHz and a carrier frequency of carrier B is $F_B$=935 MHz; and frequencies of respective local oscillator signals of two receiving channels 501A and 501B are $LO_A$=1870.1 MHz and $LO_B$=935 MHz, respectively. In a conventional solution, as shown in FIG. 8B, integral frequency division is generally used to obtain the two local oscillator signals. For example, frequency division by 2 is performed on an oscillation signal (oscillation frequency $F_{vcoA}$=3740.2 MHz) to obtain $LO_A$; and frequency division by 4 is performed on an oscillation signal (oscillation frequency $F_{vcoB}$=3740 MHz) to obtain $LO_B$. Because $F_{vcoA}$ and $F_{vcoB}$ are close in frequency, if isolation between two corresponding frequency synthesizers is limited, mutual pulling will be generated, and receiver performance will be affected drastically. Therefore, in this embodiment of the present invention, a frequency division ratio of the receiving channel 501A is set to 2, and a frequency division ratio of the receiving channel 501B is set to 3.5, so that the receiving channel 501A can perform frequency division by 2 on an oscillation signal (oscillation frequency $F_{vcoA}$=3740.2 MHz) to obtain $LO_A$; and the receiving channel 501B can perform frequency division by 3.5 on an oscillation signal (oscillation frequency $F_{vcoB}$=3272.5 MHz) by 3.5 to obtain $LO_B$, so that $F_{vcoA}$ is distant from $F_{vcoB}$. Mutual pulling between the frequency synthesizers is dependent on a difference frequency between the oscillation frequencies of the oscillation signals and on isolation between the frequency synthesizers. As the difference frequency increases, the isolation becomes better, and the mutual pulling effect becomes weaker. Therefore, it can be seen that the mutual pulling effect between the multiple frequency synthesizers 400 corresponding to the multiple receiving channels 500 basically disappears by flexibly selecting respective frequency division ratios of the multiple receiving channels 500. As shown in FIG. 9A, when the received radio frequency signal is obtained by means of non-continuous CA on carrier A and carrier B in Band 25, a carrier frequency of carrier A is $F_A$=1966.2 MHz and the carrier frequency of carrier B is $F_b$=1969.2 MHz; and therefore, local oscillator frequencies of respective local oscillator signals of two receiving channels 501A and 501B are $LO_A$=1966.2 MHz and $LO_B$=1969.2 MHz, respectively. In a conventional solution, as shown in FIG. 9B, integral frequency division is generally used to obtain the two local oscillator signals. For example, frequency division by 2 is performed on an oscillation signal (oscillation frequency $F_{vcoA}$=3932.4 MHz) to obtain $LO_A$; and frequency division by 2 is performed on an oscillation signal (oscillation frequency $F_{vcoB}$ 3938.4 MHz) to obtain $LO_B$. Assuming that a frequency synthesizer corresponding to $LO_B$ uses a reference clock source of 19.2 MHz, a spurious component (also known as boundary spur) whose frequency is $F_{spus}$=1966.8 MHz may exist in $LO_B$. If the spurious component is coupled to the receiving channel 501A and mixed with $LO_A$ to obtain a low-frequency component of $F_{spus}-LO_A$=0.6 MHz for outputting, assuming that a frequency configured for carrier A is 3 MHz, the low-frequency component of 0.6 MHz overlaps a frequency of a signal to be received by the receiving channel 501A, which drastically affects receiving performance of carrier A. In this embodiment, by setting the frequency division ratio of the receiving channel 501A to 2 and setting the frequency division ratio of the receiving channel 501B to 2.5, the receiving channel 501A can perform frequency division by 2 on an oscillation signal (oscillation frequency $F_{vcoA}$=3932.4 MHz) to obtain $LO_A$, and the receiving channel 501B can perform frequency division by 2.5 on an oscillation signal (oscillation frequency $F_{vcoB}$=4923 MHz) to obtain $LO_B$. In this way, $F_{vcoA}$ is distant from $F_{vcoB}$, so that no more spurious component that may affect receiving performance of the receiving channel 501A exists in the $LO_B$ obtained after the frequency division by the receiving channel 501B. Therefore, it can be seen that spurious coupling and crosstalk between the multiple frequency synthesizers 400 corresponding to the multiple receiving channels 500 can be suppressed by flexibly selecting respective frequency division ratios of the multiple receiving channels 500.

In this embodiment, the multiple frequency division ratios from which the frequency division ratio of the any receiving channel is selected may be selected from a set that includes multiple integral frequency division ratios and multiple fractional frequency division ratios. In other words, the multiple frequency division ratios may include at least two frequency division ratios of multiple integral frequency division ratios and multiple fractional frequency division ratios. That is, the multiple frequency division ratios may be a set of multiple integral frequency division ratios or may be a set of multiple fractional frequency division ratios or may be a set of fractional frequency division ratios and integral frequency division ratios. In this embodiment, because multiple frequency division ratios that include a fractional frequency division ratio and/or an integral frequency division ratio are provided, it is very flexible for each receiving channel to select its own frequency division ratio to suppress mutual interference between the frequency synthesizers corresponding to the receiving channels.

Figure 4:
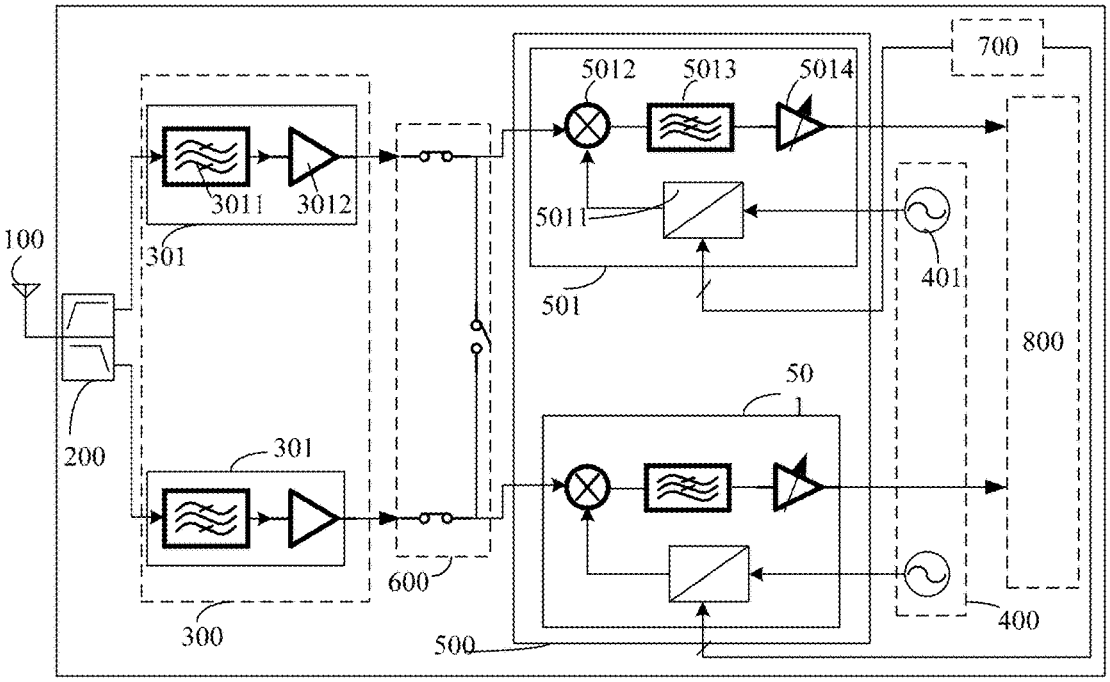
FIG. 4 is a circuit diagram of a radio frequency receiver according to Embodiment 1 of the present invention.

The following further describes the technical solution in this embodiment of the present invention with reference to a specific radio frequency receiver architecture shown in FIG. 4. It should be noted that, for brevity, FIG. 4 only exemplarily shows an architecture of a receiver that includes two receiving channels and two frequency synthesizers. In practical application, the receiving channels may be expanded on the basis of FIG. 4. Therefore, the content in FIG. 4 should not be construed as to limit the protection scope of the present invention. As shown in FIG. 4, the processing circuit 300 may include multiple processing units 301. A quantity of the multiple processing units 301 may be equal to a quantity of output ends of the band splitter 200. The multiple processing units 301 are coupled to the output ends of the band splitter 200 separately. Each processing unit 301 is configured to perform filtering and amplification processing on one band signal in the at least one band signal output by the band splitter 200 to obtain one processed signal. Still using the receiver shown in FIG. 8A as an example, when the carrier aggregated signal is an inter-band aggregation of carrier A in Band 8 and carrier B in Band 3, the band splitter 200 may be a Diplexer. Correspondingly, the Diplexer has two output ends: a first output end and a second output end. The first output end is configured to output a band signal of a high band, namely, a band signal (Band 3) in which carrier B is located. The second output end is configured to output a band signal of a low band, namely, a band signal (Band 8) in which carrier A is located. Correspondingly, the processor 300 also includes two processing units. One of the processing units is coupled to the first output end and is configured to perform filtering and amplification processing on a signal of a high band (Band 3), and the other processing unit is coupled to the second output end and is configured to perform filtering and amplification processing on a signal of a low band (Band 8). It should be noted that in a special situation, namely, when the radio frequency signal includes only a first carrier and a second carrier and the first carrier and the second carrier are intra-band continuous aggregated carriers or intra-band non-continuous aggregated carriers, because the band splitter 200 outputs only one band signal, assuming the band splitter 200 is still a Diplexer, the band signal may be output by the first output end or the second output end. If the first output end outputs the band signal, only a processing unit, in the multiple processing units, coupled to the first output end of the Diplexer processes the band signal to obtain a processed signal that includes the first carrier and the second carrier.

In this embodiment, any processing unit 301 in the multiple processing units 301 may include a bandpass filter 3011 and a radio frequency amplifier 3012. An input end of the bandpass filter 3011 is coupled to an output end of the band splitter 200, and an output end of the bandpass filter 3011 is coupled to an input end of the radio frequency amplifier 3012. The bandpass filter 3011 is configured to receive one band signal in the at least one band signal output by the band splitter 200, and filter out a signal outside a band of the band signal to obtain a signal within one band. The radio frequency amplifier 3012 is configured to receive the signal, obtained after filtering by the bandpass filter 3011, within one band, and perform gain amplification on the signal within the band to obtain the processed signal. It should be understood that structures of the multiple processing units may be the same, except that, in order to process signals in different bands, a range of frequencies allowed to pass the bandpass filter in each processing unit varies. In addition, when radio frequency preamplifiers in various radio receivers amplify a weak signal, interference to the signal caused by noise of the radio frequency amplifiers may be severe. To reduce such noise and improve an output signal-to-noise ratio, a low-noise amplifier is generally selected to perform bandpass filtering and gain amplification on a radio frequency signal. Reference may be made to the prior art, and details are not described herein again.

In this embodiment, as shown in FIG. 4, the radio frequency receiver may further include a switching unit 600. The switching unit 600 is coupled between the multiple processing units 301 and the multiple receiving channels 500. The switching unit 600 is configured to exercise switching control, so that the any receiving channel is selectively coupled to a processing unit in the processing circuit 300 to receive the processed signal that includes the target carrier of the any receiving channel. Specifically, refer to FIG. 5. In the radio frequency receiver shown in FIG. 5, the multiple receiving channels 500 include two receiving channels (for ease of description, denoted by 501A and 501B respectively), and the processing circuit 300 includes two processing units (for ease of description, denoted by 301A and 301B respectively), and therefore, the switching unit 600 may specifically include a first switch 601, a second switch 602, and a third switch 603. One end of the first switch 601 is coupled to an output end of the processing unit 301A, and the other end of the first switch 601 is separately coupled to a radio frequency input end of the receiving channel 501A and one end of the second switch 602. One end of the third switch 603 is coupled to an output end of the processing unit 301B, and the other end of the third switch 603 is coupled to a radio frequency input end of the receiving channel 501B and the other end of the second switch 602. By controlling on-off of the three switches, the switching unit 600 can implement reception of different types of CA signals. For example, when the radio frequency signal is obtained by means of an inter-band CA on carrier B in Band 3 and carrier A in Band 8, referring to FIG. 8A, the switching unit can control the first switch 601 and the third switch 603 to be turned on at the same time, and control the second switch 602 to be turned off, so that the band signal Band 3 is transmitted to the receiving channel 501A along a link of 301A->601->501A and that the band signal Band 8 is transmitted to the receiving channel 501B along a link of 301B->603->501B. A target carrier of the receiving channel 501A is carrier B, and a target carrier of the receiving channel 501B is carrier A. When the radio frequency signal is obtained by means of a non-continuous CA on two carriers A and B in a band signal Band 25, referring to FIG. 9A, because the band splitter 200 cannot split multiple carriers in one band, the band splitter 200 can select only one output end to output the band signal. Assuming that the processing unit 301A performs filtering and amplification processing on Band 25 output by the band splitter 200, the switching unit controls the first switch 601 and the second switch 602 to be turned on at the same time and controls the third switch 603 to be turned off, so that the band signal Band 25 is transmitted to the receiving channel 501A along a link of 301A->601->501A and is transmitted to the receiving channel 501B along a link of 301A->601->602->501B at the same time. A target carrier of the receiving channel 501A is carrier A, and a target carrier of the receiving channel 501B is carrier B. It should be noted that, for brevity, reference numerals of components are omitted in FIG. 8A, FIG. 8B, FIG. 9A, and FIG. 9B. For details, reference may be made to the reference numerals in FIG. 5.

Figure 5:
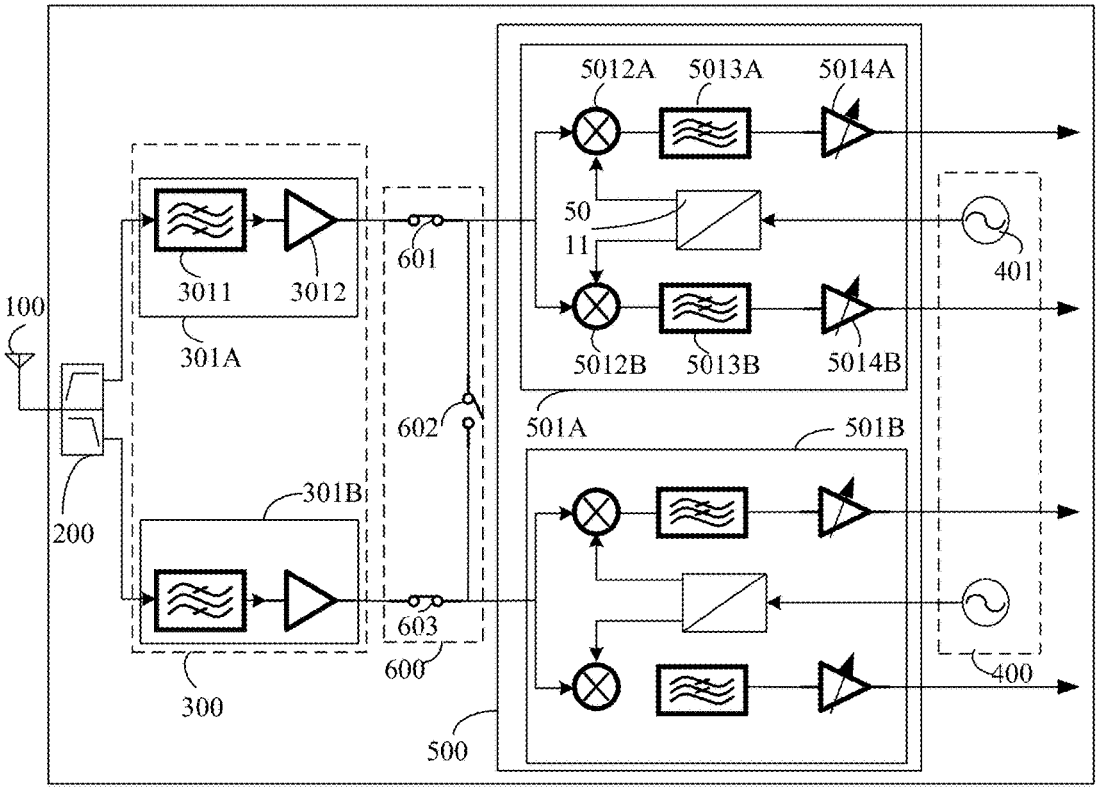
FIG. 5 is a circuit diagram of another radio frequency receiver according to Embodiment 1 of the present invention.
Figure 7:
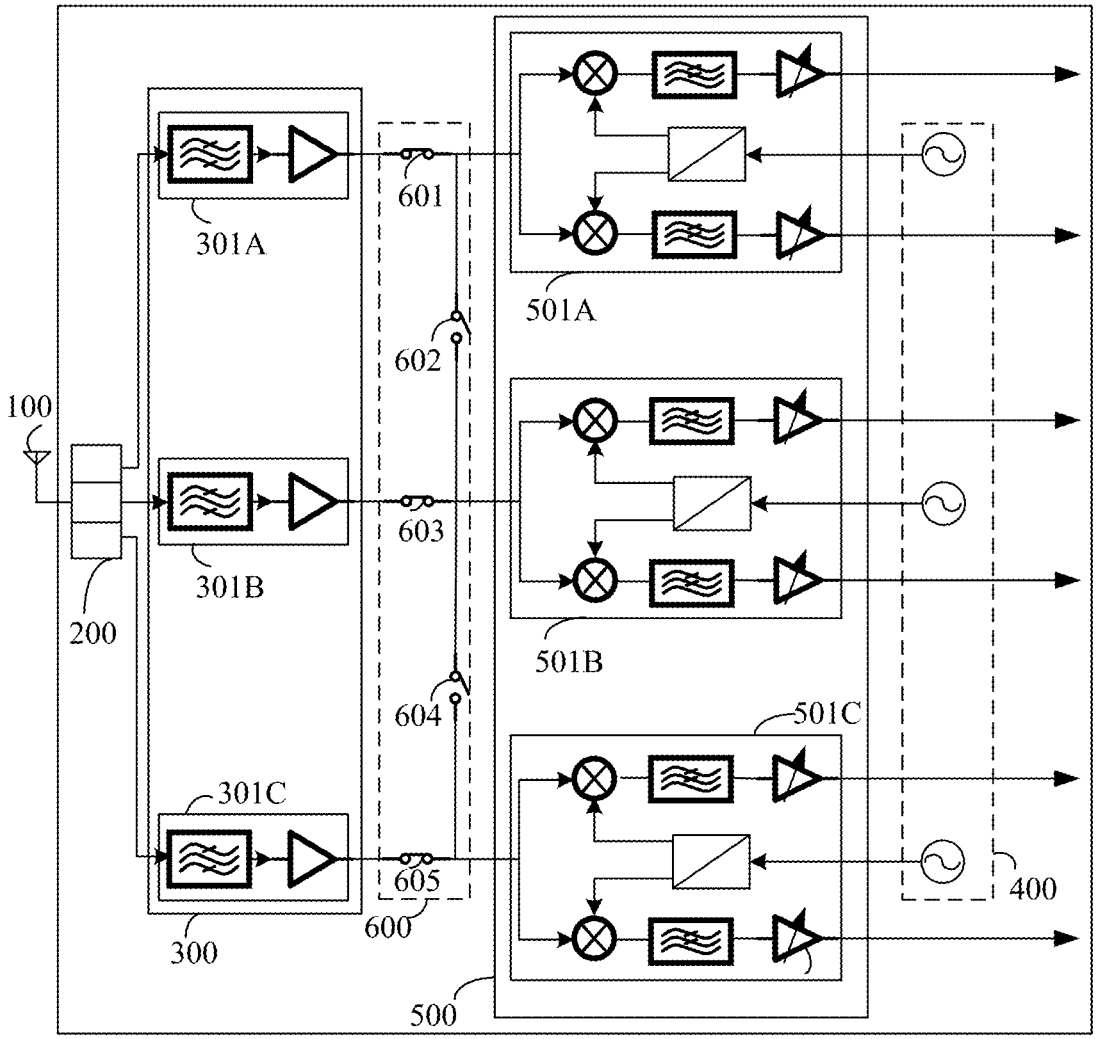
FIG. 7 is a circuit diagram of still another radio frequency receiver according to Embodiment 1 of the present invention.
Figure 10:
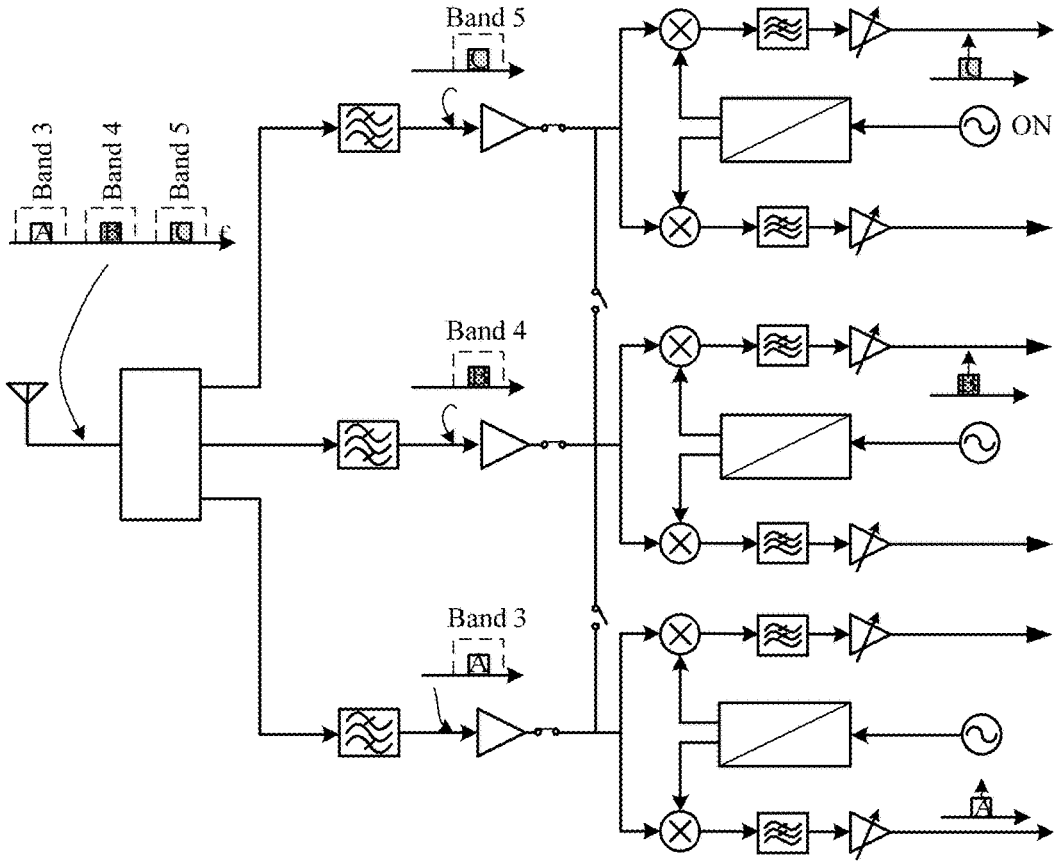
FIG. 10 is a schematic diagram of the radio frequency receiver shown in FIG. 7 receiving an inter-band non-continuous CA signal.
Figure 11:
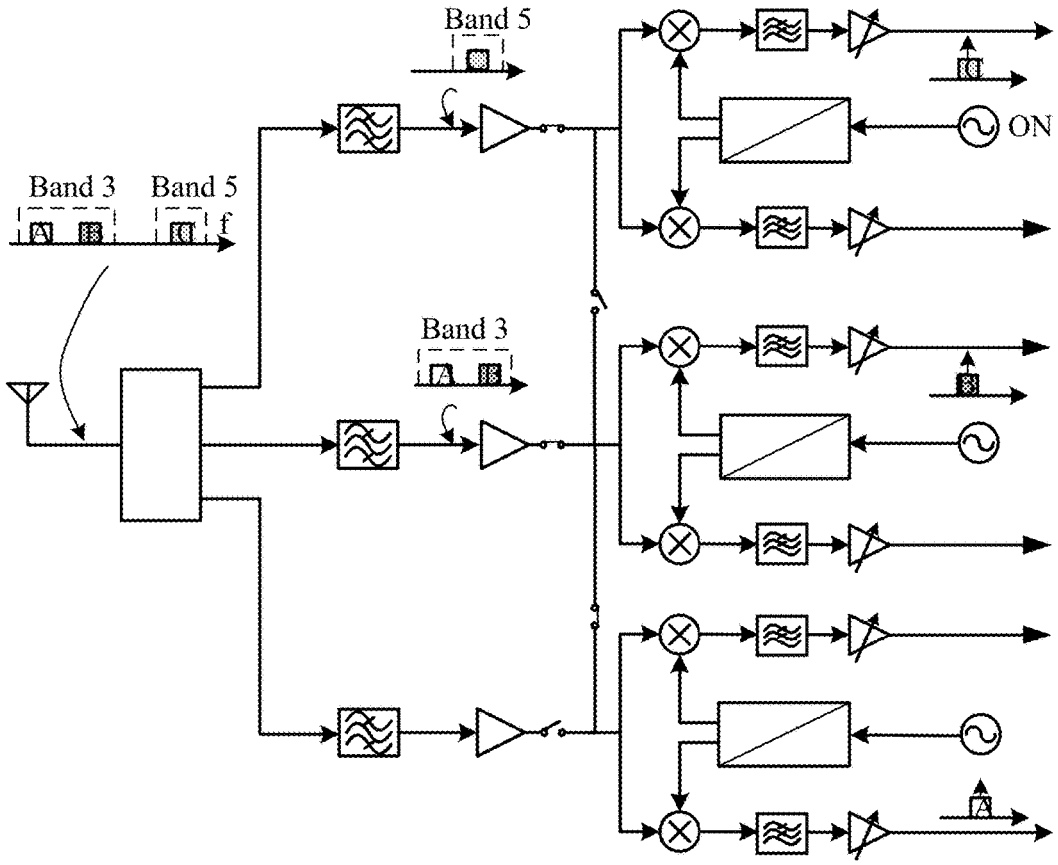
FIG. 11 is a schematic diagram of the radio frequency receiver shown in FIG. 7 receiving another inter-band non-continuous CA signal.

Further, on the basis of FIG. 5, with reference to FIG. 7, when the radio frequency receiver includes three processing units (301A, 301B, 301C) and three receiving channels (501A, 501B, 501C), the switching unit 600 may further include a fourth switch 604 and a fifth switch 605. By controlling on-off of the five switches, more types of CA signals can be received. For example, when the radio frequency signal is obtained by means of an inter-band CA on three carriers: carrier A in Band 3, carrier B in Band 4, and carrier C in Band 5, referring to FIG. 10, the switching unit controls the first switch 601, the third switch 603 and the fifth switch 605 to be turned on at the same time and controls the second switch 602 and the fourth switch 604 to be turned off, so that Band 5 is transmitted to the receiving channel 501A along 301A->601->501A, Band 4 is transmitted to the receiving channel 501B along 301B->603->501B, and Band 3 is transmitted to the receiving channel 501C along 301C->605->501C. A target carrier of the receiving channel 501A is carrier C, a target carrier of the receiving channel 501B is carrier B, and a target carrier of the receiving channel 501C is carrier A. When the radio frequency signal is obtained by means of a non-continuous CA on carriers A and B in Band 3 and is then aggregated with carrier C in Band 5 in an inter-band CA manner, referring to FIG. 11, assuming that the processing unit 301B processes Band 3 that includes carriers A and B, the switching unit 600 can control the first switch 601, the third switch 603 and the fourth switch 604 to be turned on at the same time and control the second switch 602 and the fifth switch 605 to be turned off, so that Band 5 can be transmitted to the receiving channel 501A along 301A->601->501A, and Band 3 can be transmitted to the receiving channel 501B along 301B->603->501B and transmitted to the receiving channel 501C along 301B->603->604->501C. A target carrier of the receiving channel 501A is carrier C, a target carrier of the receiving channel 501B is carrier B, and a target carrier of the receiving channel 501C is carrier A. It should be noted that, for brevity, reference numerals of components are omitted in FIG. 10 and FIG. 11. For details, reference may be made to the reference numerals in FIG. 7.

In conclusion, in this embodiment, the switching unit 600 may exercise switching control, so that any receiving channel of the multiple receiving channels 500 selectively receives, from at least one processed signal that is processed by the processing circuit 300, a processed signal that includes a target carrier of the any receiving channel, and therefore, the radio frequency receiver in this embodiment can be widely applied to multiple application scenarios, such as intra-band continuous CA, intra-band non-continuous CA, and inter-band CA, and is highly compatible. It should be noted that in this embodiment of the present invention, a combination of multiple switches is used to describe working principles of the switching unit 600. In practical application, a person skilled in the art may use other circuits or chips with a switching control function to implement corresponding functions.

In this embodiment, as shown in FIG. 4, the any receiving channel of the multiple receiving channels 500 may specifically include:

a configurable frequency divider 5011, configured to: receive a control signal (control, CTRL); selectively select, under control of the control signal, the frequency division ratio of the any receiving channel from the multiple frequency division ratios; and perform, based on the frequency division ratio, frequency division on the oscillation signal received by the any receiving channel to obtain the local oscillator signal;

a frequency mixer 5012, configured to use the local oscillator signal to perform frequency mixing on the received processed signal to obtain a mixed signal;

a lowpass filter 5013, configured to perform noise suppression on the mixed signal; and a baseband amplifier 5014, configured to amplify a mixed signal obtained after noise suppression is performed by the lowpass filter, so as to generate the baseband signal corresponding to the target carrier.

Figure 6A:
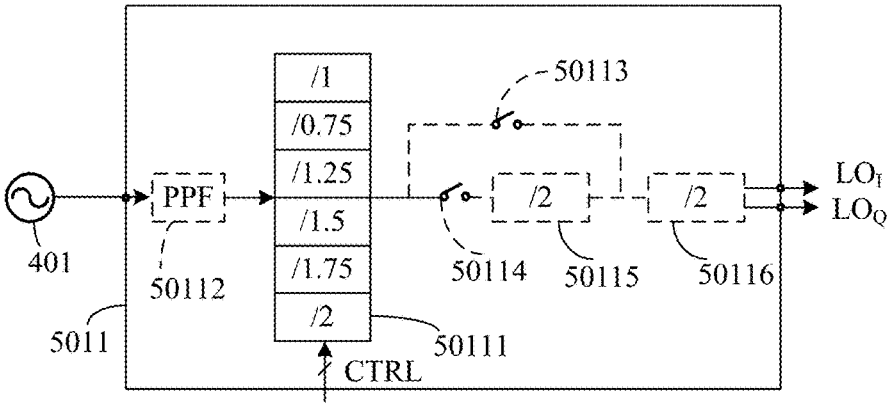
FIG. 6A is a circuit diagram of a configurable frequency divider according to Embodiment 1 of the present invention.

Still further, as shown in FIG. 6A, in a possible implementation manner, the configurable frequency divider 5011 may specifically include a one-out-of-many frequency divider 50111. The one-out-of-many frequency divider 50111 includes multiple frequency division modes. Each frequency division mode corresponds to an integral frequency division ratio or a fractional frequency division ratio. For example, multiple frequency division modes such as frequency division by 1, frequency division by 0.75, frequency division by 1.25, frequency division by 1.5, frequency division by 1.75, and frequency division by 2 may be included. The one-out-of-many frequency divider is configured to receive the control signal CTRL, and configure, under control of the control signal, one frequency division mode of the multiple frequency division modes as a current working mode, so as to implement selective selection of the frequency division ratio of the any receiving channel from the multiple frequency division ratios.

Figure 6B:
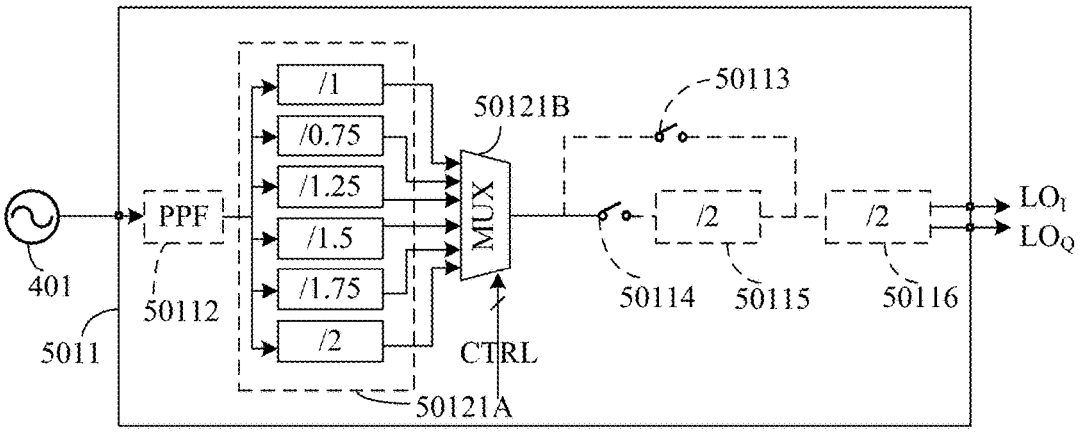
FIG. 6B is a circuit diagram of another configurable frequency divider according to Embodiment 1 of the present invention.

As shown in FIG. 6B, in another possible implementation manner, the configurable frequency divider 5011 may also include multiple frequency dividing units 50121A and a selector 50121B. Each frequency dividing unit corresponds to an integral frequency division ratio or a fractional frequency division ratio. One ends of the multiple frequency dividing units 50121A are separately coupled to an input end of the configurable frequency divider 5011, the other ends of the multiple frequency dividing units 50121A are separately coupled to an input end of the selector 50121B, and an output end of the selector 50121B is coupled to an output end of the configurable frequency divider 5011. The selector 50121B is configured to: receive the control signal CTRL, select, under control of the control signal, one frequency dividing unit of the multiple frequency dividing units, and turn on the frequency dividing unit, so as to implement selective selection of the frequency division ratio of the any receiving channel from the multiple frequency division ratios. Each frequency dividing unit may be a frequency dividing component or circuit with a frequency division capability. For example, the frequency dividing unit may be an integral frequency divider for frequency division by 1, frequency division by 2, or the like, or may be a fractional frequency divider for frequency division by 0.75, frequency division by 1.25, frequency division by 1.5, a frequency divider by 1.75, or the like, which is not limited in this embodiment. It should be understood that the configurable frequency divider 5011 in this embodiment of the present invention may also be other frequency dividing components with multiple frequency division ratios, or may be a circuit or a chip or the like that is a combination of multiple ordinary frequency dividing components and that is with multiple frequency division ratios. Therefore, the specific circuit structure shown in FIG. 6A and FIG. 6B should not be construed as to limit the protection scope of the present invention.

In this embodiment, further, as shown in FIG. 4, the radio frequency receiver may further include a control signal generator 700, configured to generate a control signal required by the configurable frequency divider in the any receiving channel, so as to control the multiple receiving channels to select their respective frequency division ratios to suppress mutual interference between the multiple frequency synthesizers.

A zero-intermediate-frequency receiver does not involve an intermediate frequency in a down-conversion process, and an image frequency is the radio frequency signal itself and no image frequency interference exists. Therefore, compared with other types of receivers, the zero-intermediate-frequency receiver can omit components such as an image suppression filter and an intermediate-frequency filter, and has obvious advantages in cost efficiency and single-chip integration. Therefore, in this embodiment, the any receiving channel of the multiple receiving channels 500 may be a zero-intermediate-frequency receiving channel. The following describes a zero-intermediate-frequency receiving channel briefly with reference to FIG. 5. As shown in FIG. 5, when the any receiving channel is a zero-intermediate-frequency receiving channel, the frequency mixer 5012 may include two in-phase quadrature I/Q frequency mixers: an in-phase frequency mixer 5012A and a quadrature frequency mixer 5012B, which are separately configured to receive a processed signal that includes a target carrier of the any receiving channel, and use two local oscillator signals ($L0_I$, and $LO_Q$) whose phase difference is 90° to perform frequency mixing on the received processed signal to obtain two mixed signals. The lowpass filter 5013 may include an in-phase lowpass filter 5013A and a quadrature lowpass filter 5013B, which are respectively configured to perform noise suppression on the mixed signals obtained through mixing by the in-phase frequency mixer 5012A and the quadrature frequency mixer 5012B. The baseband amplifier 5014 may include an in-phase baseband amplifier 5014A and a quadrature baseband amplifier 5014B, which are respectively configured to amplify mixed signals obtained after noise suppression is performed by the in-phase lowpass filter 5013A and the quadrature lowpass filter 5013B, so as to generate two I/Q baseband signals corresponding to the target carrier. It should be understood that a person skilled in the art is well versed in an architecture of a zero-intermediate-frequency receiver, which is not detailed herein again. For details, reference may be made to the prior art.

Further, when the any receiving channel is a zero-intermediate-frequency receiving channel, as shown in FIG. 6A and FIG. 6B, the configurable frequency divider may further include a poly-phase filter (Poly-Phase Filter, PPF) 50112. The poly-phase filter 50112 is coupled between the input end of the configurable frequency divider 5011 and an input end of the one-out-of-many frequency divider 50111, or is coupled between the input end of the configurable frequency divider 5011 and input ends of the multiple frequency dividing units 50121A, and is configured to perform poly-phase filtering on an oscillation signal that is input from a frequency synthesizer 401 corresponding to the any receiving channel to the configurable frequency divider 5011, so as to generate multiple oscillation signals with a specific phase difference, so that the one-out-of-many frequency divider 50111 or the multiple frequency dividing units 50121A perform frequency division on an oscillation signal obtained through poly-phase filtering to generate local oscillator signals $LO_I$ and $LO_Q$ with a phase difference of 90°. Specifically, the poly-phase filter 50112 may use different clock edges to delay phases of frequency-divided signals to generate a specific phase difference. A mechanism of using clock edges to implement phase delay is a common sense well known by a person skilled in the art, and is not detailed herein again, and reference may be made to the prior art.

Further, as shown in FIG. 6A and FIG. 6B, the configurable frequency divider 5011 may further include a sixth switch 50113, a seventh switch 50114, a first integral frequency divider 50115, and a second integral frequency divider 50116. By means of turn-on control of the sixth switch 50113 and the seventh switch 50114, the first integral frequency divider 50115 and the second integral frequency divider 50116 can be used to perform further frequency division on a signal output by the one-out-of-many frequency divider 50111 or the selector 50121B. For example, assuming that both the first integral frequency divider 50115 and the second integral frequency divider 50116 are divide-by-two frequency dividers, if the sixth switch 50113 is controlled to be turned on and the seventh switch 50114 is controlled to be turned off at the same time, a frequency of the signal output by the one-out-of-many frequency divider 50111 or the selector 50121B may be divided by two; and if the sixth switch 50113 is controlled to be turned off and the seventh switch 50114 is controlled to be turned on at the same time, a frequency of the signal output by the one-out-of-many frequency divider 50111 or the selector 50121B may be divided by four, which thereby improves flexibility of the configurable frequency divider 5011 in configuring the frequency division ratio and is conducive to expanding width of a frequency-divided signal.

In this embodiment, further, as shown in FIG. 4, the radio frequency receiver may further include a baseband processor 800, configured to perform baseband processing on a baseband signal output by the multiple receiving channels 500, and when the receiving channels are zero-intermediate-frequency receiving channels, specifically perform baseband processing on two I/Q baseband signals. For working principles of the baseband processor, reference may be made to the prior art, and details are not described herein again.

In this embodiment, the radio frequency receiver is a single-chip integrated radio frequency receiver. That is, the multiple frequency synthesizers 400 and the multiple receiving channels 500 are integrated in an integrated circuit. Certainly, the processing circuit 300, the switching unit 600, and the control signal generator 700 may be integrated, for example, in a radio frequency chip. For the single-chip integrated radio frequency receiver that includes multiple frequency synthesizers, the technical solution in this embodiment of the present invention can be used to effectively suppress mutual interference caused by mutual proximity of the multiple frequency synthesizers. Compared with a conventional multi-chip solution for receiving a multi-carrier CA signal, the single-chip integrated radio frequency receiver provided in the present invention can reduce an area of a chip and reduce costs. It should be noted that, using an intelligent terminal as an example, the baseband processor 800 is generally integrated in a main chip independent of a radio frequency chip. In this embodiment of the present invention, the antenna 100 and the baseband processor 800 are introduced in order to clearly describe a complete process from reception of a radio frequency signal to completion of baseband signal processing.

Embodiment 2

Figure 12:
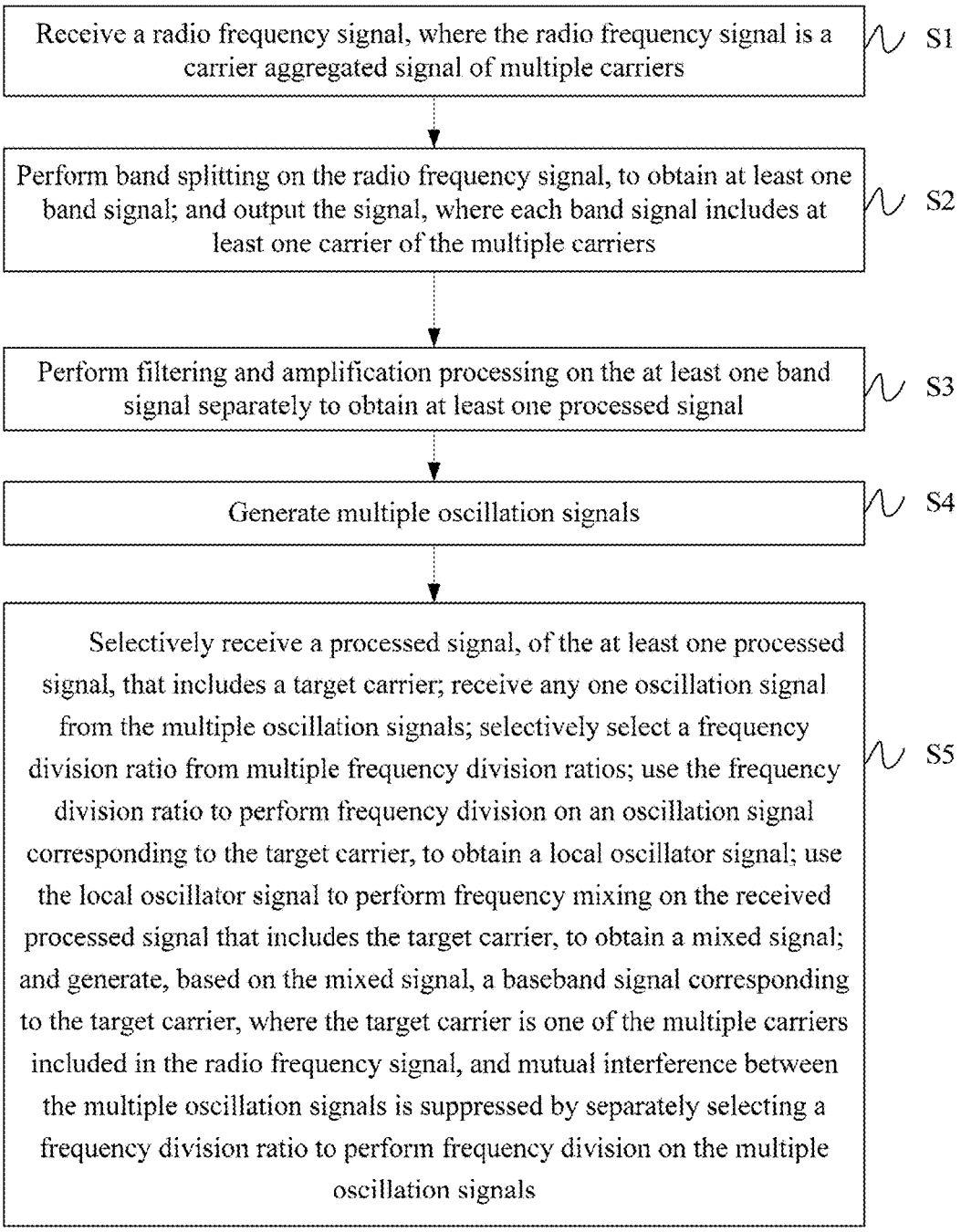
FIG. 12 is a flowchart of a receiving method according to Embodiment 2 of the present invention.

Based on the radio frequency receiver in Embodiment 1, as shown in FIG. 12, this embodiment of the present invention further provides a method for receiving a multi-carrier aggregated radio frequency signal, including the following steps:

S1. Receive a radio frequency signal, where the radio frequency signal is a carrier aggregated signal of multiple carriers.

S2. Perform band splitting on the radio frequency signal to obtain at least one band signal, and output the signal, where each band signal includes at least one carrier of the multiple carriers.

S3. Separately perform filtering and amplification processing on the at least one band signal to obtain at least one processed signal.

S4. Generate multiple oscillation signals.

S5. Selectively receive a processed signal, of the at least one processed signal, that includes a target carrier; receive an oscillation signal, of the multiple oscillation signals, corresponding to the target carrier; selectively select a frequency division ratio from multiple frequency division ratios; use the frequency division ratio to perform frequency division on the received oscillation signal to obtain a local oscillator signal; use the local oscillator signal to perform frequency mixing on the received processed signal that includes the target carrier to obtain a mixed signal; and generate, based on the mixed signal, a baseband signal corresponding to the target carrier, where the target carrier is one of the multiple carriers included in the radio frequency signal.

Mutual interference between the multiple oscillation signals is suppressed by separately selecting a frequency division ratio to perform frequency division on the multiple oscillation signals.

It should be noted that in a single-chip integrated radio frequency receiver, mutual interference between multiple oscillation signals generated by multiple frequency synthesizers mainly includes: 1. mutual pulling; and 2. spurious coupling and crosstalk. By separately selecting a frequency division ratio, the radio frequency receiver in this embodiment of the present invention avoids superimposition between a signal obtained after a frequency of one oscillation signal corresponding to the target carrier in the multiple oscillation signals is divided and a target carrier corresponding to another oscillation signal except the oscillation signal corresponding to the target carrier, and avoids superimposition between spurious components of the signal obtained after the frequency of the oscillation signal corresponding to the target carrier in the multiple oscillation signals is divided and the target carrier corresponding to the another oscillation signal except the oscillation signal corresponding to the target carrier. That is, mutual pulling and spurious coupling and crosstalk between the multiple oscillation signals are suppressed by selecting multiple frequency division ratios to perform frequency division on the multiple oscillation signals.

In this embodiment, the multiple frequency division ratios are selected from a set that includes multiple integral frequency division ratios and multiple fractional frequency division ratios. In other words, the multiple frequency division ratios may include at least two frequency division ratios of multiple integral frequency division ratios and multiple fractional frequency division ratios. Because multiple frequency division ratios that include a fractional frequency division ratio and/or an integral frequency division ratio are provided, when the radio frequency receiver in this embodiment of the present invention receives a radio frequency signal, each receiving channel can more flexibly select its own frequency division ratio, so as to suppress mutual interference between the frequency synthesizers corresponding to the receiving channels.

In S3, the separately performing filtering and amplification processing on the at least one band signal to obtain at least one processed signal may specifically include:

receiving one band signal in the at least one band signal, filtering out a signal outside a band of the band signal to obtain a signal within one band, and performing gain amplification on the signal within the band to obtain the at least one processed signal.

Further, in S5, the selectively receiving a processed signal, of the at least one processed signal, that includes a target carrier may include:

exercising switching control, so as to implement selective reception, from the at least one processed signal, of the processed signal that includes the target carrier of the any receiving channel.

In S5, the selectively selecting a frequency division ratio from multiple frequency division ratios, and using the frequency division ratio to perform frequency division on the received oscillation signal to obtain a local oscillator signal may include:

receiving a control signal; selectively selecting, under control of the control signal, the frequency division ratio from the multiple frequency division ratios; and performing, based on the frequency division ratio, frequency division on the received oscillation signal to obtain the local oscillator signal.

It should be noted that Embodiment 2 of the present invention is a method embodiment based on the radio frequency receiver provided in Embodiment 1, and therefore, for related features in Embodiment 1 and Embodiment 2, reference may be made mutually.

It should be understood that specific embodiments described herein are merely general embodiments of the present invention, but are not intended to limit the present invention. Any modification, equivalent replacement, and improvement made without departing from the principle of the present invention shall fall within the protection scope of the present invention.

What is claimed is:

[1. A radio frequency receiver comprising:

a band splitter, wherein an input end of the band splitter is coupled to an antenna, and the band splitter is configured to receive a radio frequency signal from the antenna, perform band splitting on the radio frequency signal to obtain at least one band signal, and output the at least one band signal, wherein the radio frequency signal is a carrier aggregated signal of multiple carriers, and each band signal comprises at least one carrier of the multiple carriers;

a processing circuit, wherein the processing circuit is coupled to an output end of the band splitter, and is configured to separately perform filtering and amplification processing on the at least one band signal to obtain at least one processed signal;

multiple frequency synthesizers configured to generate multiple oscillation signals; and multiple receiving channels, wherein each of the multiple receiving channels is associated with one of the multiple frequency synthesizers in a one-to-one manner, and any of the multiple receiving channels is configured to:

selectively receive a processed signal from the processing circuit that comprises a target carrier of the any receiving channel;

receive an oscillation signal generated by a frequency synthesizer associated with the any receiving channel;

selectively select a frequency division ratio of the any receiving channel from multiple frequency division ratios;

use the frequency division ratio to perform frequency division on the received oscillation signal to obtain a local oscillator signal of the any receiving channel;

use the local oscillator signal to perform frequency mixing on the received processed signal that comprises the target carrier to obtain a mixed signal; and generate, based on the mixed signal, a baseband signal associated with the target carrier, wherein the target carrier is one of the multiple carriers comprised in the radio frequency signal, and the multiple receiving channels suppress mutual interference between the multiple frequency synthesizers by separately selecting their respective frequency division ratios, wherein any of the receiving channels selects the frequency division ratio and a mutual pulling effect between an oscillation signal generated by one of the frequency synthesizers corresponding to any of the receiving channels and another oscillation signal among the multiple oscillation signals, except the oscillation signals corresponding to any of the receiving channels are suppressed and no superimposition occurs between the target carrier of any of the receiving channels and a signal obtained after any of the receiving channels performs frequency division on a spurious component of the another oscillation signal.]

[2. The radio frequency receiver according to claim 1, wherein the multiple frequency division ratios are selected from a set that comprises multiple integral frequency division ratios and multiple fractional frequency division ratios.]

[3. The radio frequency receiver according to claim 1, wherein the processing circuit comprises multiple processing units, and each of the multiple processing units is associated with one of the output ends of the band splitter in a one-to-one manner, and any of the multiple processing units comprises:

a bandpass filter, configured to receive one band signal in the at least one band signal output by the band splitter, and filter out a signal outside a band of the band signal to obtain a signal within one band; and a radio frequency amplifier, coupled to the bandpass filter and configured to receive the signal within the band and perform gain amplification on the signal within the band to obtain a processed signal.]

[4. The radio frequency receiver according to claim 3, wherein the radio frequency receiver further comprises: a switching unit, wherein the switching unit is coupled between the multiple processing units and the multiple receiving channels, and the switching unit is configured to exercise switching control, to enable the any receiving channel to be selectively coupled to a processing unit in the processing circuit to receive the processed signal.]

[5. The radio frequency receiver according to claim 1, wherein the any receiving channel comprises:

a configurable frequency divider, configured to:

receive a control signal;

selectively select, under control of the control signal, the frequency division ratio of the any receiving channel from the multiple frequency division ratios; and perform, based on the frequency division ratio of the any receiving channel, frequency division on the oscillation signal received by the any receiving channel to obtain the local oscillator signal;

a frequency mixer, configured to use the local oscillator signal to perform frequency mixing on the received processed signal to obtain the mixed signal;

a lowpass filter, configured to perform noise suppression on the mixed signal; and a baseband amplifier, configured to amplify the mixed signal obtained after noise suppression, so as to generate the baseband signal corresponding to associated with the target carrier.]

[6. The radio frequency receiver according to claim 5, wherein: the configurable frequency divider comprises a frequency divider, and the frequency divider comprises multiple frequency division modes, wherein each of the frequency division modes is associated with an integral frequency division ratio or a fractional frequency division ratio; and the frequency divider is configured to configure, under control of the control signal, one frequency division mode of the multiple frequency division modes as a current working mode, so as to implement selective selection of the frequency division ratio of the any receiving channel from the multiple frequency division ratios.]

[7. The radio frequency receiver according to claim 5, wherein the configurable frequency divider comprises multiple frequency dividing units and a selector, wherein:

each of the frequency dividing units is associated with an integral frequency division ratio or a fractional frequency division ratio;

one end of the multiple frequency dividing units is separately coupled to an input end of the configurable frequency divider, and the other end of the multiple frequency dividing unit is separately coupled to an input end of the selector;

an output end of the selector is coupled to an output end of the configurable frequency divider, and the selector is configured to: receive the control signal; select, under control of the control signal, one frequency dividing unit of the multiple frequency dividing units; and turn on the frequency dividing unit, so as to implement selective selection of the frequency division ratio of the any receiving channel from the multiple frequency division ratios.]

[8. The radio frequency receiver according to claim 5, wherein the radio frequency receiver further comprises a control signal generator, configured to generate a control signal required by the configurable frequency divider in the any receiving channel.]

[9. The radio frequency receiver according to claim 1, wherein the radio frequency receiver further comprises a baseband processor, configured to perform baseband processing on baseband signals output by the multiple receiving channels.]

[10. The radio frequency receiver according to claim 1, wherein the any receiving channel is a zero-intermediate-frequency receiving channel.]

[11. The radio frequency receiver according to claim 1, wherein the multiple frequency synthesizers and the multiple receiving channels are integrated in an integrated circuit.]

12. A receiving method comprising:

performing band splitting on a radio frequency signal to obtain at least one band signal, and outputting the at least one band signal, wherein the radio frequency signal is a carrier aggregated signal of multiple carriers, and each of the band signals comprises at least one carrier of the multiple carriers;

separately performing filtering and amplification processing on the at least one band signal to obtain at least one processed signal;

generating multiple oscillation signals;

selectively receiving a processed signal, of the at least one processed signal, that comprises a target carrier;

receiving an oscillation signal, of the multiple oscillation signals, associated with the target carrier;

selectively selecting a frequency division ratio from multiple frequency division ratios;

using the frequency division ratio to perform frequency division on the received oscillation signal to obtain a local oscillator signal;

using the local oscillator signal to perform frequency mixing on the received processed signal that comprises the target carrier to obtain a mixed signal; and generating, based on the mixed signal, a baseband signal associated with the target carrier, wherein the target carrier is one of the multiple carriers comprised in the radio frequency signal, and mutual interference between the multiple oscillation signals is suppressed by separately selecting a frequency division ratio to perform frequency division on the multiple oscillation signals, wherein, by separately selecting a frequency division ratio, a mutual pulling effect between the received oscillation signal and another oscillation signal, in the multiple oscillation signals, is suppressed, and no superimposition occurs between the target carrier and a signal obtained after performing frequency division on a spurious component of another oscillation signal.

13. The method according to claim 12, wherein the multiple frequency division ratios are selected from a set that comprises multiple integral frequency division ratios and multiple fractional frequency division ratios.

14. The method according to claim 12, wherein the separately performing filtering and amplification processing on the at least one band signal to obtain the at least one processed signal comprises:

receiving a band signal in the at least one band signal;

filtering out a signal outside a band of the band signal to obtain a signal within one band; and performing gain amplification on the signal within the one band to obtain the at least one processed signal.

15. The method according to claim 14, wherein the selectively receiving the processed signal, of the at least one processed signal, that comprises the target carrier comprises:

exercising switching control, so as to implement selective reception of the processed signal, of the at least one processed signal, that comprises the target carrier.

16. The method according to claim 12, wherein the selectively selecting the frequency division ratio from multiple frequency division ratios, and using the frequency division ratio to perform frequency division on the received oscillation signal to obtain the local oscillator signal comprises:

receiving a control signal, and selectively selecting, under control of the control signal, the frequency division ratio from the multiple frequency division ratios; and performing, based on the frequency division ratio, frequency division on the received oscillation signal to obtain the local oscillator signal.

*17. A receiver comprising:*

*a first amplifier configured to amplify a first radio frequency (RF) input signal, and provide a first RF output signal, wherein the first RF input signal includes at least a first carrier of a RF carrier aggregation signal;*

*a second amplifier configured to amplify a second RF input signal, and provide a second RF output signal, wherein the second RF input signal includes at least a second carrier of the RF carrier aggregation signal;*

*a switcher configured to switch at least one of the first RF output signal and the second RF output signal to be coupled to a first mixer or a second mixer according to the RF carrier aggregation signal, which is obtained in a manner of intra-band continuous carrier aggregation (CA), intra-band non-continuous CA or inter-band non-continuous CA;*

*the first mixer configured to use a first local oscillator (LO) signal that is based on a first voltage controlled oscillator (VCO) to perform frequency mixing to obtain a first mixed signal;*

*the second mixer configured to use a second LO signal that is based on a second VCO to perform frequency mixing to obtain a second mixed signal;*

*the first mixer, the second mixer, the first VCO and the second VCO are integrated in one integrated circuit; and*

*a first configurable frequency divider comprising at least two first frequency dividers and configured to provide different division ratios by combining one or more of the first frequency dividers, wherein the first configurable frequency divider is for performing frequency division on an oscillation signal of the first VCO to obtain the first LO signal.*

*18. The receiver according to claim 17, wherein the first frequency configurable frequency divider further comprises:*

*a first selector, wherein one end of each of the at least two first frequency dividers is separately coupled to an input end of the first configurable frequency divider, the other end of each of the at least two first frequency dividers is separately coupled to an input end of the first selector, and an output end of the first selector is coupled to an output end of the first configurable frequency divider.*

*19. The receiver according to claim 18, wherein the first selector is a multiplexer (MUX) configured to select, under control of a control signal (CTRL), one frequency divider of the at least two first frequency dividers, and turn on the one frequency divider.*

*20. The receiver according to claim 17, further comprising:*

*a second configurable frequency divider comprises at least two second frequency dividers and configured to provide different division ratios by combining one or more of the second frequency dividers, wherein the second configurable frequency divider is for performing frequency division on an oscillation signal of the second VCO to obtain the second LO signal.*

*21. The receiver according to claim 20, wherein the second configurable frequency divider further comprises:*

*a second selector, wherein one end of each of the at least two second frequency dividers is separately coupled to an input end of the second configurable frequency divider, the other end of each of the at least two second frequency dividers is separately coupled to an input end of the second selector, an output end of the second selector is coupled to an output end of the second configurable frequency divider.*

*22. The receiver according to claim 21, wherein the second selector is a multiplexer (MUX) configured to select, under control of a control signal (CTRL), one frequency divider of the at least two second frequency dividers, and turn on the one frequency divider.*

*23. The receiver according to claim 17, wherein the RF carrier aggregation signal is received by an antenna and passed through a diplexer.*

*24. The receiver according to claim 17, wherein the RF carrier aggregation signal is received by an antenna and passed through a triplexer.*

*25. A terminal comprising:*

*a baseband processor and a receiver coupled to the baseband processor; wherein the receiver comprises:*

*a first amplifier configured to amplify a first radio frequency (RF) input signal, and provide a first RF output signal, wherein the first RF input signal includes at least a first carrier of a RF carrier aggregation signal;*

*a second amplifier configured to amplify a second RF input signal, and provide a second RF output signal, wherein the second RF input signal includes at least a second carrier of the RF carrier aggregation signal;*

*a switcher configured to switch at least one of the first RF output signal and the second RF output signal to be coupled to a first mixer or a second mixer according to the RF carrier aggregation signal, which is obtained in a manner of intra-band continuous carrier aggregation (CA), intra-band non-continuous CA or inter-band non-continuous CA;*

*the first mixer configured to use a first local oscillator (LO) signal that is based on a first voltage controlled oscillator (VCO) to perform frequency mixing to obtain a first mixed signal;*

*the second mixer configured to use a second LO signal that is based on a second VCO to perform frequency mixing to obtain a second mixed signal;*

*the first mixer, the second mixer, the first VCO and the second VCO are integrated in one integrated circuit; and*

*a first configurable frequency divider comprising at least two first frequency dividers and configured to provide different division ratios by combining one or more of the first frequency dividers, wherein the first configurable frequency divider is for performing frequency division on an oscillation signal of the first VCO to obtain the first LO signal.*

*26. The terminal according to claim 25, wherein the first configurable frequency divider further comprises:*

*a first selector configured to select, under control of a control signal (CTRL), one frequency divider of the at least two first frequency dividers to provide a division ratio.*

*27. The terminal according to claim 25, further comprising:*

*a second configurable frequency divider comprising at least two second frequency dividers and configured to provide different division ratios by combining one or more of the second frequency dividers, wherein the second configurable frequency divider is for performing frequency division on an oscillation signal of the second VCO to obtain the second LO signal.*

*28. The terminal according to claim 27, wherein the second configurable frequency divider further comprises:*

*a second selector configured to select, under control of a control signal (CTRL), one frequency divider of the at least two second frequency dividers to provide a division ratio.*

* * * * *